（12）United States Patent
Hwang et al.

(10) Patent No.: US 10,809,437 B2
(45) Date of Patent: Oct. 20, 2020

(54) OPTICAL MEMBER AND DISPLAY DEVICE INCLUDING THE SAME

(71) Applicant: Samsung Display Co. Ltd., Yongin-si (KR)

(72) Inventors: Seong Yong Hwang, Hwaseong-si (KR); Tae Gil Kang, Hwaseong-si (KR); Sang Won Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 50 days.

(21) Appl. No.: 16/030,866

(22) Filed: Jul. 10, 2018

(65) Prior Publication Data

US 2019/0056547 A1 Feb. 21, 2019

(30) Foreign Application Priority Data

Aug. 18, 2017 (KR) .................. 10-2017-0104766

(51) Int. Cl.
*G02B 6/00* (2006.01)
*F21V 8/00* (2006.01)

(52) U.S. Cl.
CPC .......... *G02B 6/0026* (2013.01); *G02B 6/0023* (2013.01)

(58) Field of Classification Search
CPC .................. G02B 6/0023; G02B 6/0026
See application file for complete search history.

(56) References Cited

U.S. PATENT DOCUMENTS

| 9,199,842 | B2 | 12/2015 | Dubrow et al. | |
|---|---|---|---|---|
| 2013/0114299 | A1* | 5/2013 | Lee ................ | G02B 6/0011 362/612 |
| 2013/0128614 | A1* | 5/2013 | Lee ................ | G02B 6/0023 362/609 |
| 2013/0258709 | A1* | 10/2013 | Thompson ........... | G02B 6/0025 362/608 |
| 2014/0029298 | A1* | 1/2014 | Hyun ................ | G02B 6/0003 362/608 |
| 2014/0168571 | A1* | 6/2014 | Hyun ................ | G02F 1/133615 349/61 |
| 2014/0375938 | A1 | 12/2014 | Meyers et al. | |
| 2015/0253482 | A1* | 9/2015 | Seo ................ | G02B 6/0026 362/608 |

(Continued)

FOREIGN PATENT DOCUMENTS

| KR | 10-2013-0120486 | 11/2013 |
|---|---|---|
| KR | 10-2016-0044149 | 4/2016 |

(Continued)

*Primary Examiner* — Julie A Bannan
(74) *Attorney, Agent, or Firm* — H.C. Park & Associates, PLC

(57) ABSTRACT

An optical member includes a light guide plate having a top surface, a bottom surface, and side surfaces that connect the top surface and the bottom surface three-dimensionally and have a smaller area than the top surface and the bottom surface, a low refractive layer disposed on a side surface of the light guide plate and having a lower refractive layer than the light guide plate, and a wavelength conversion layer disposed on the low refractive layer, the wavelength conversion layer receiving first wavelength light and converting the first wavelength light into second wavelength light, which is of a different wavelength band from the first wavelength light.

11 Claims, 17 Drawing Sheets

(56) References Cited

U.S. PATENT DOCUMENTS

| | | | |
|---|---|---|---|
| 2016/0091657 A1* | 3/2016 | Yang | G02F 1/133615 |
| | | | 362/608 |
| 2016/0103267 A1 | 4/2016 | An et al. | |
| 2016/0109635 A1* | 4/2016 | Lee | G02B 6/0026 |
| | | | 349/65 |
| 2017/0097457 A1* | 4/2017 | Park | G02B 6/0026 |
| 2017/0146718 A1* | 5/2017 | Cheng | G02B 6/00 |
| 2018/0106948 A1* | 4/2018 | Wong | G02B 6/005 |
| 2018/0267225 A1* | 9/2018 | Wong | G02B 6/0023 |
| 2018/0364408 A1 | 12/2018 | Hwang et al. | |

FOREIGN PATENT DOCUMENTS

| | | |
|---|---|---|
| KR | 10-2017-0039810 | 4/2017 |
| KR | 10-2018-0137627 | 12/2018 |

* cited by examiner

OPTICAL MEMBER AND DISPLAY DEVICE INCLUDING THE SAME

CROSS-REFERENCE TO RELATED APPLICATION

This application claims priority from and the benefit of Korean Patent Application No. 10-2017-0104766, filed on Aug. 18, 2017, which is hereby incorporated by reference for all purposes as if fully set forth herein.

BACKGROUND

Field

Exemplary embodiments of the invention relate to an optical member and a display device including the same.

Discussion of the Background

A liquid crystal display (LCD) device displays an image by receiving light from a backlight assembly. The backlight assembly generally includes a light source and a light guide plate. The light guide plate guides the traveling direction of light emitted from the light source so as to travel toward a display panel. Light provided by the light source may be white light, in which case, colors are realized by filtering white light with a color filter.

Recently, research has been conducted on ways to apply a wavelength conversion film to the LCD device in order to improve the display quality of the LCD device (such as color reproducibility). Typically, a blue light source is used as the light source, and a wavelength conversion film is disposed above the light guide plate to convert blue light into white light. The wavelength conversion film contains wavelength conversion particles. The wavelength conversion particles are generally susceptible to moisture and are thus protected by a barrier film. The barrier film, however, is expensive and increases the thickness of the wavelength conversion film. Also, since the wavelength conversion film needs to be stacked on the light guide plate, a complicated assembly process may be needed.

The above information disclosed in this Background section is only for enhancement of understanding of the background of the inventive concepts, and, therefore, it may contain information that does not constitute prior art.

SUMMARY

Exemplary embodiments provide an optical member having a light guide function and including a sealed wavelength conversion layer.

Exemplary embodiments provide a display device including an optical member having a light guide function and including a sealed wavelength conversion layer Additional aspects will be set forth in the detailed description which follows, and, in part, will be apparent from the disclosure, or may be learned by practice of the inventive concepts.

In an embodiment, an optical member includes a light guide plate having a top surface, a bottom surface, and side surfaces disposed in between and connect the top surface and the bottom surface, and each of the side surfaces has a smaller area than each of the top surface and the bottom surface. A low refractive layer is disposed on a side surface of the light guide plate and has a lower refractive index than the light guide plate. A wavelength conversion layer is disposed on the low refractive layer, the wavelength conversion layer is configured to receive a first wavelength light and converting the first wavelength light into a second wavelength light, which is of a different wavelength band from the first wavelength light. The low refractive layer includes a first surface, which faces the side surface of the light guide plate where the low refractive layer is disposed, a second surface, which is opposite to the first surface of the low refractive layer, and edges. The wavelength conversion layer includes a first surface, which faces the second surface of the low refractive layer, a second surface, which is opposite to the first surface of the wavelength conversion layer, and side surfaces disposed in between and connect the first and second surfaces of the wavelength conversion layer.

A passivation layer may be disposed on the second surface of the wavelength conversion layer and cover the second surface and the side surfaces of the wavelength conversion layer and the edges of the low refractive layer.

The first surface of the low refractive layer may be in contact with the side surface of the light guide plate where the low refractive layer is disposed.

The passivation layer may be in contact with the light guide plate.

The passivation layer may transmit the first wavelength light therethrough and reflect the second wavelength light.

The side surfaces of the wavelength conversion layer may be aligned with the edges of the low refractive layer.

The edges of the low refractive layer and the side surfaces of the wavelength conversion layer may be aligned with the top surface and the bottom surface of the light guide plate.

A passivation layer may be disposed between the wavelength conversion layer and the low refractive layer and cover the first surface and the side surfaces of the wavelength conversion layer.

A color filter layer may be disposed on the second surface of the wavelength conversion layer, the color filter layer configured to transmit the first wavelength light therethrough and reflect the second wavelength light.

The color filter layer may include a first surface, which faces the second surface of the wavelength conversion layer, a second surface, which is opposite to the first surface of the color filter layer, and side surfaces, which are disposed in between and connect the first and second surfaces of the color filter layer, and the passivation layer may cover the side surfaces of the color filter layer.

The color filter layer may include a plurality of laminated films that are formed of an inorganic material.

An exemplary embodiment of a display device includes an optical member which has a light guide plate with a top surface, a bottom surface, and side surfaces, which are disposed in between and connect the top surface and the bottom surface. A low refractive layer is disposed on a side surface of the light guide plate and having a lower refractive index than the light guide plate. A wavelength conversion layer is disposed on the low refractive layer, the wavelength conversion layer is configured to receive a first wavelength light and convert the first wavelength light into a second wavelength light, which is of a different wavelength band from the first wavelength light. A passivation layer is disposed on the wavelength conversion layer. A light source is disposed adjacent to the side surface of the light guide plate where the low refractive layer is disposed, and a display panel is disposed on the top surface of the light guide plate. The low refractive layer includes a first surface, which faces the side surface of the light guide plate, a second surface, which is opposite to the first surface of the low refractive layer, and edges. The wavelength conversion layer includes a first surface, which faces the side surface of the light guide plate where the low refractive layer is disposed, a second surface, which is opposite to the first surface of the wavelength conversion layer, and side surfaces, which are disposed in between and connect the first and second surfaces of the wavelength conversion layer.

The passivation layer may be disposed on the second surface of the wavelength conversion layer and cover the second surface and the side surfaces of the wavelength conversion layer and the edges of the low refractive layer.

The passivation layer may transmit the first wavelength light therethrough and reflect the second wavelength light.

The passivation layer may be disposed between the wavelength conversion layer and the low refractive layer and cover the first surface and the side surfaces of the wavelength conversion layer.

The edges of the low refractive layer may be substantially aligned with the side surfaces of the wavelength conversion layer, and the side surfaces of the wavelength conversion layer may perpendicularly intersect the second surface of the low refractive layer.

A light transmission blocking pattern may overlap with a side surface of the wavelength conversion layer and be disposed substantially in parallel to the top surface of the light guide plate.

Another exemplary embodiment provides an optical member including a base member having a first surface, a second surface, and side surfaces, which are disposed in between and connect the first and second surfaces of the base member, and each of the side surfaces of the base member has a smaller area than each of the first and second surfaces of the base member. A wavelength conversion layer is disposed on the first surface of the base member and includes a second surface, which faces the first surface of the base member, a first surface, which is opposite to the second surface of the wavelength conversion layer, and side surfaces, which are disposed in between and connect the first and second surfaces of the wavelength conversion layer, and each of the side surfaces of the wavelength conversion layer has a smaller area than each of the first and second surfaces of the wavelength conversion layer, the wavelength conversion layer is configured to receive first wavelength light and convert the first wavelength light into a second wavelength light, which is of a different wavelength band from the first wavelength light. A passivation layer is disposed on the first surface of the wavelength conversion layer. The side surfaces of the base member may be substantially aligned with the side surfaces of the wavelength conversion layer, and the passivation layer may cover the first surface and the side surfaces of the wavelength conversion layer and the side surfaces of the base member.

A color filter layer may be disposed between the base member and the wavelength conversion layer, the color filter layer configured to transmit the first wavelength light therethrough and reflect the second wavelength light.

The color filter layer may include a first surface, which faces the second surface of the wavelength conversion layer, a second surface, which faces the first surface of the base member, and side surfaces, which are disposed in between and connect the first and second surfaces of the color filter layer.

The side surfaces of the color filter layer may be aligned with the side surfaces of the base member and the side surfaces of the wavelength conversion layer.

The base member may include an inorganic material.

The side surfaces of the wavelength conversion layer may be positioned inside the edges of the low refractive layer.

The edges of the low refractive layer and the side surfaces of the wavelength conversion layer may be positioned inside the top surface and the bottom surface of the light guide plate.

According to exemplary embodiments, the optical member, which is a single integral member, not only can perform both a light guide function and a wavelength conversion function, but also can prevent the deterioration of a wavelength conversion layer with the use of a sealing structure. Also, since the optical member according to an exemplary embodiment is a single integral member, the optical member according to an exemplary embodiment is relatively thin and can thus simplify the assembly of a display device.

Other features and exemplary embodiments may be apparent from the following detailed description, the drawings, and the claims.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
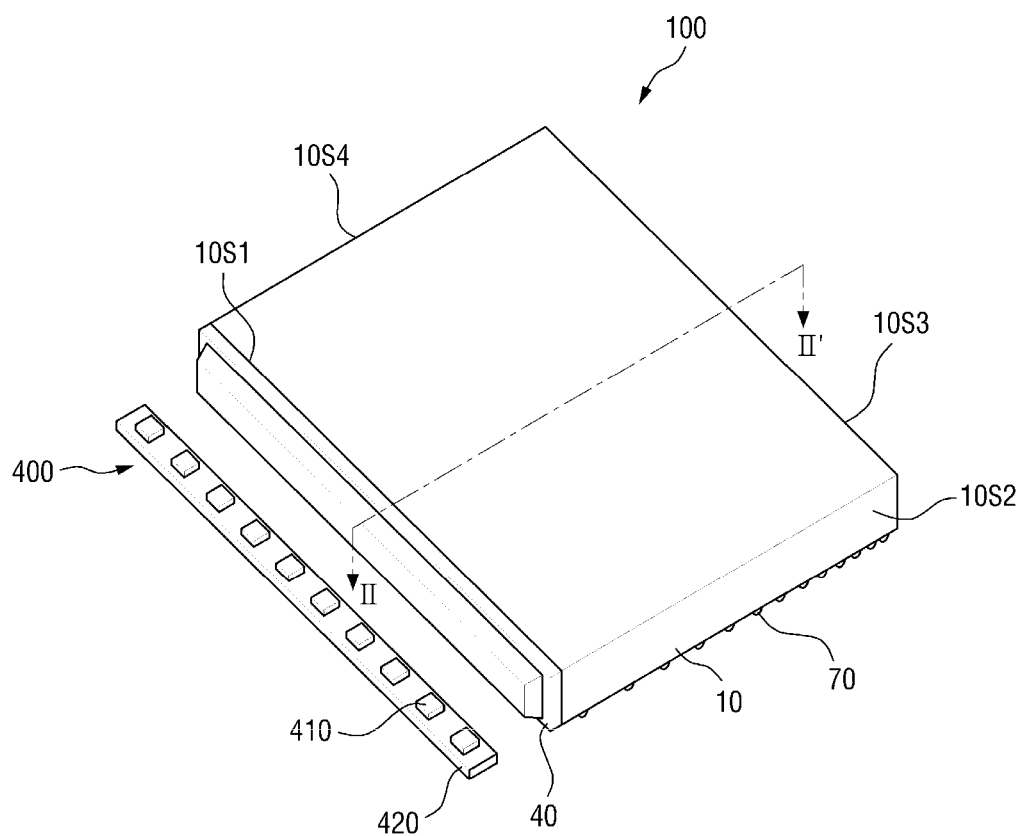
FIG. 1 is a perspective view illustrating an optical member and a light source according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the inventive concepts.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not necessarily intended to illustrate the actual shape of a region of a device and may not be intended to be limiting.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

Figure 2:
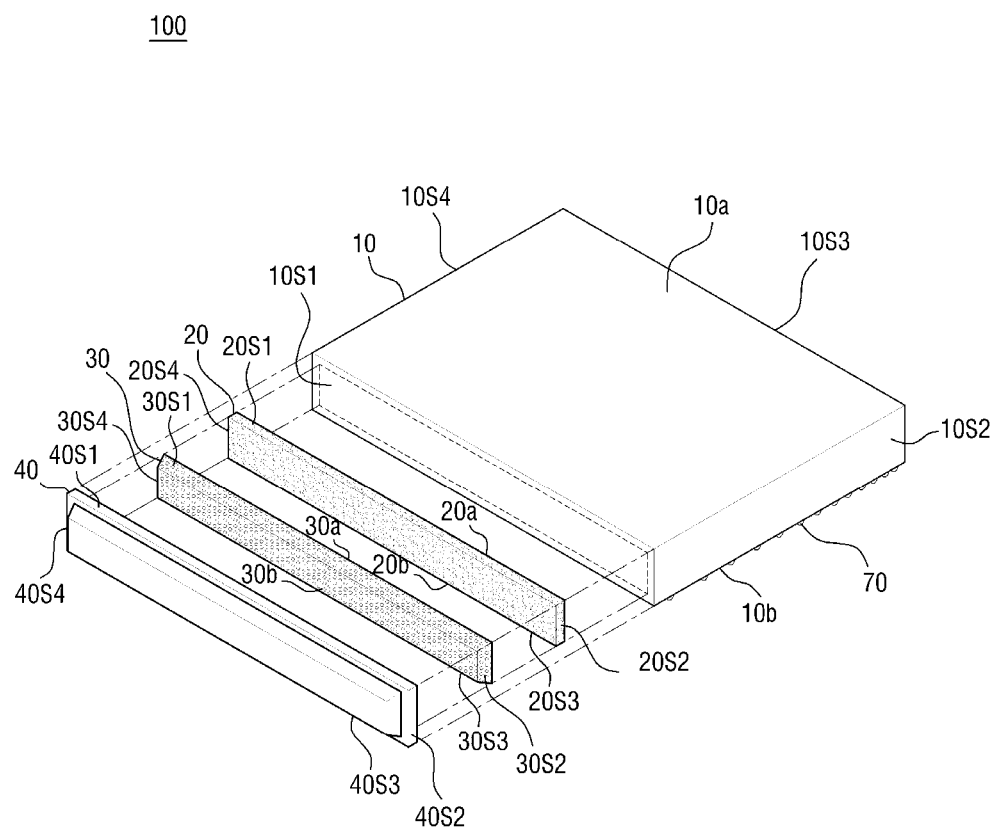
FIG. 2 is an exploded perspective view of the optical member of FIG. 1.
Figure 3:
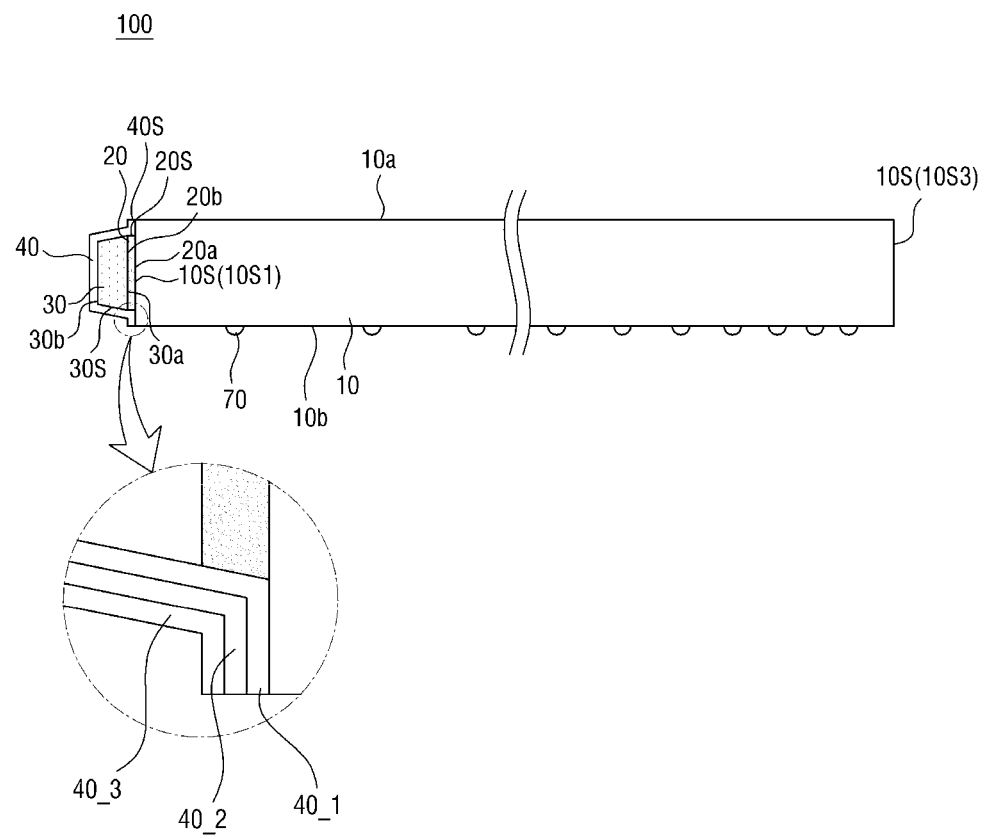
FIG. 3 is a cross-sectional view taken along line II-IF of FIG. 1.

FIG. 1 is a perspective view illustrating an optical member and a light source according to an exemplary embodiment. FIG. 2 is an exploded perspective view of the optical member of FIG. 1. FIG. 3 is a cross-sectional view taken along line II-IF of FIG. 1.

Referring to FIGS. 1 through 3, an optical member 100 includes a light guide plate 10, a first low refractive layer 20, which is disposed on a side of the light guide plate 10, a wavelength conversion layer 30, which is disposed on the first low refractive layer 20, and a passivation layer 40, which is disposed on the wavelength conversion layer 30. The light guide plate 10, the first low refractive layer 20, the wavelength conversion layer 30, and the passivation layer 40 may be formed in one integral body with each other.

The light guide plate 10 guides the traveling path of light. The light guide plate 10 may be formed as a polygonal column. The planar shape of the light guide plate 10 may be rectangular, but exemplary embodiments not limited thereto. In one exemplary embodiment, the light guide plate 10 may be formed as a rectangular parallelepiped having a rectangular planar shape and may have top and bottom surfaces 10a and 10b and four side surfaces. The four side surfaces of the light guide plate 10 will hereinafter be referred to as first through fourth side surfaces 10s1 through 10s4, if necessary, or collectively as the side surfaces 10s.

In one exemplary embodiment, each of the top and bottom surfaces 10a and 10b of the light guide plate 10 may be placed over a single plane, the plane where the top surface 10a of the light guide plate 10 is placed and the plane where the bottom surface 10b of the light guide plate 10 is placed may be substantially parallel to each other, and as a result, the light guide plate 10 may have a generally uniform thickness. However, exemplary embodiments are not limited thereto. That is, in another exemplary embodiment, each of the top and bottom surfaces 10a and 10b of the light guide plate 10 may consist of multiple planes, or the plane where the top surface 10a of the light guide plate 10 is placed and the plane where the bottom surface 10b of the light guide plate 10 is placed may intersect each other. The thickness of the light guide plate 10, which is, for example, wedge-shaped, may become smaller from one side surface (i.e., a light incidence surface 10s1) to the other side surface (i.e., an opposing surface 10s3) of the light guide plate 10. Also, the bottom surface 10b of the light guide plate 10 may become upwardly inclined so as for the thickness of the light guide plate 10 to gradually decrease from one side surface (for example, the light incidence surface 10s1) to the other side surface (for example, the opposing surface 10s3) of the light guide plate 10, and may then become parallel to the top surface 10a of the light guide plate 10.

Figure 16:
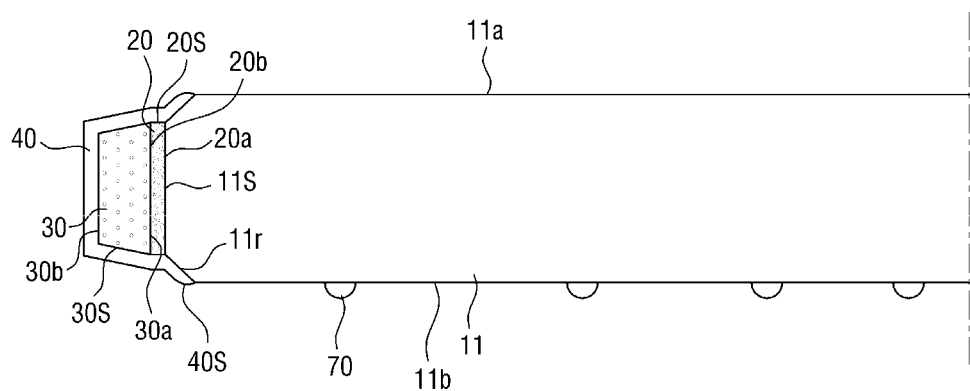
FIG. 16 and FIG. 17 are cross-sectional views of optical members according to other exemplary embodiments.
Figure 17:
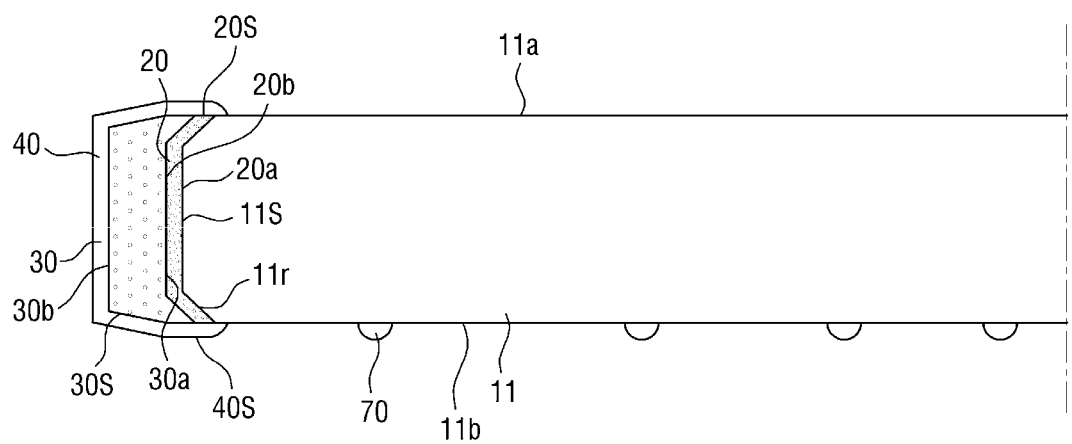

The planes where the top surface 10a and/or the bottom surface 10b are placed may form an angle of about 90° with the planes where the side surfaces 10s are placed. In some exemplary embodiments, as illustrated in FIGS. 16 and 17, the light guide plate 10 may further have inclined corner side surfaces between the top surface 10a and the side surfaces 10s and/or between the bottom surface 10b and the side surfaces 10s. The inclined corner side surfaces will be described later with reference to FIGS. 16 and 17, and the light guide plate 10 will hereinafter be described as having the top surface 10a and the side surfaces 10s that directly meet at an angle of 90° without any corner side surfaces therebetween.

A light source 400 may be disposed adjacent to at least one side surface 10s of the light guide plate 10. FIGS. 1 through 3 illustrate an example in which a plurality of light-emitting diodes (LEDs) 410 mounted on a printed circuit board 420 are disposed along a long side of the light guide plate 10, but exemplary embodiments are not limited thereto. That is, alternatively, the LEDs 410 may be disposed along both long side surfaces 10s1 and 10s3 of the light guide plate 10 or may be disposed along one short side surface 10s or both short side surfaces 10s2 and 10s4 of the light guide plate 10. In the exemplary embodiment of FIG. 1, a side surface of the light guide plate 10 along which the light source 400 is disposed may be the light incidence surface 10s1, and a side surface of the light guide plate that is opposite to the side surface along which the light source 400 is disposed may be the opposing surface 10s3.

Diffusion patterns 70 may be disposed on the bottom surface 10b of the light guide plate 10. The diffusion patterns 70 change the angle of light traveling within the light guide plate 10 through total internal reflection so as to emit the light to the outside of the light guide plate 10.

In one exemplary embodiment, the diffusion patterns 70 may be provided as a separate layer or separate patterns. For example, a pattern layer, including protrusion patterns and/or recess patterns, or printed patterns may be formed on the bottom surface 10b of the light guide plate 10 as the diffusion patterns 70.

In another exemplary embodiment, the diffusion patterns 70 may be surface shapes formed on the light guide plate 10. That is, recesses may be formed on the bottom surface 10b of the light guide plate 10 as the diffusion patterns 70.

The density of the diffusion patterns 70 may differ from one area to another area. For example, the diffusion patterns 70 may be sparsely populated in an area near the light incidence surface 10s1 having a relatively large amount of light and may be densely populated in an area near the opposing surface 10s1 having a relatively small amount of light.

The light guide plate 10 may comprise an inorganic material. For example, the light guide plate 10 may be formed of glass, but exemplary embodiments are not limited thereto.

The first low refractive layer 20 is disposed on at least one side surface 10s of the light guide plate 10. The first low refractive layer 20 may be formed directly on, and placed in contact with, at least one side surface 10s of the light guide plate 10. The first low refractive layer 20 may be interposed between the light guide plate 10 and the wavelength conversion layer 30 and may thus help total internal reflection in the light guide plate 10.

In one exemplary embodiment, the first low refractive layer 20 may be disposed on the light incidence surface 10s1 of the light guide plate 10. Specifically, in order for the light guide plate 10 to efficiently guide light from the light incidence surface 10s1 to the opposing surface 10s3, an effective total internal reflection may preferably take place at the top surface 10a and/or the bottom surface 10b of the light guide plate 10. One of the conditions under which an effective total internal reflection can take place within the light guide plate 10 is that light incident upon the light incidence surface 10s1 of the light guide plate 10 has a larger incidence angle with respect to the top surface 10a and/or the bottom surface 10b of the light guide plate 10 than a critical angle. As the angle of emission of light at the light incidence surface 10s1 of the light guide plate 10 decreases, the angle of incidence of light at the top surface 10a and/or the bottom surface 10b of the light guide plate 10 increases, and as a result, more total internal reflection can take place within the light guide plate 10.

In a case where the light guide plate 10 is formed of, for example, glass having a refractive index of about 1.5, the top surface 10a and/or the bottom surface 10b of the light guide plate 10 are exposed to an air layer having a refractive index of about 1 and thus have a critical angle of about 42.4°. As a result, total internal reflection can sufficiently take place.

In a case where the light incidence surface 10s1 of the light guide plate 10 is exposed to, and thus forms an optical interface with, an air layer, all rays of light incident upon the light incidence surface 10s1 have an emission angle of 0° to 47.6° according to Snell's law. That is, in the case where the light incidence surface 10s1 of the light guide plate 10 is exposed to an air layer, most of the light incident upon the light incidence surface 10s1 of the light guide plate 10 may be totally reflected by the top surface 10a and/or the bottom surface 10b of the light guide plate 10.

On the other hand, in a case where optical function layers are integrally formed on the light incidence surface 10s1 of the light guide plate 10, light is refracted by the optical function layers, and as a result, the angle of emission of light incident upon the light guide plate 10 may fall outside the range of 0° to 47.6°. That is, in a case where the angle of emission of light at the light incidence surface 10s1 of the light guide plate 10 is greater than 47.6°, the light may not be totally reflected because the angle of incidence of light at the top surface 10a and/or the bottom surface 10b of the light guide plate 10 is smaller than 42.4°.

The first low refractive layer 20, which is interposed between the light guide plate 10 and the wavelength conversion layer 30 and forms an optical interface with a side surface 10s of the light guide plate 10, for example, the light incidence surface 10s1, has a lower refractive index than the light guide plate 10 and thus controls the angle of emission of light incident upon the light guide plate 10. The first low refractive layer 20 also has a lower refractive index than the wavelength conversion layer 30 and may thus control the angle of incidence of light at the light guide plate 10 by totally reflecting some rays of light at the optical interface between the wavelength conversion layer 30 and the first low refractive layer 20. Specifically, rays of light having too large an incidence angle with respect to the light incidence surface 10s1 of the light guide plate 10 have a smaller incidence angle with respect to the top surface 10a and/or the bottom surface 10b of the light guide plate 10 than the critical angle and thus do not meet the condition for total internal reflection. The first low refractive layer 20 allows only light having a sufficiently small incidence angle to be totally reflected by the top surface 10a and/or the bottom surface 10b of the light guide plate 10 to enter the light guide plate 10 and thus helps total internal reflection in the light guide plate 10.

The difference between the refractive index of the light guide plate 10 and the refractive index of the first low refractive layer 20 may be 0.2 or greater. If the refractive index of the first low refractive layer 20 is lower than the refractive index of the light guide plate 10 by 0.2 or more, sufficient total internal reflection may take place via the top surface 10a of the light guide plate 10. There is particularly no upper limit to the difference between the refractive index of the light guide plate 10 and the refractive index of the first low refractive layer 20, but the difference between the refractive index of the light guide plate 10 and the refractive index of the first low refractive layer 20 may preferably be set to 1 or less in consideration of the material of the light guide plate 10 and the refractive index of the first low refractive layer 20.

The refractive index of the first low refractive layer 20 may be in the range of 1.2 to 1.4. In general, as the refractive index of a solid medium becomes close to 1, the manufacturing cost of the solid medium may exponentially increase. If the refractive index of the first low refractive layer 20 is 1.2 or higher, an increase in manufacturing cost can be prevented. The refractive index of the first low refractive layer 20 may preferably be 1.4 or lower, which is advantageous for controlling the angle of emission of light incident upon the light guide plate 10. In one exemplary embodiment, a first low refractive layer 20 having a refractive index of about 1.25 may be used.

In order to achieve a low refractive index, the first low refractive layer 20 may have voids VD. The voids VD may be vacuumed or filled with an air layer, gas, or the like. The voids VD may be defined by particles PT, matrices MX, or the like. This will hereinafter be described with reference to FIGS. 4 and 5.

Figure 4:
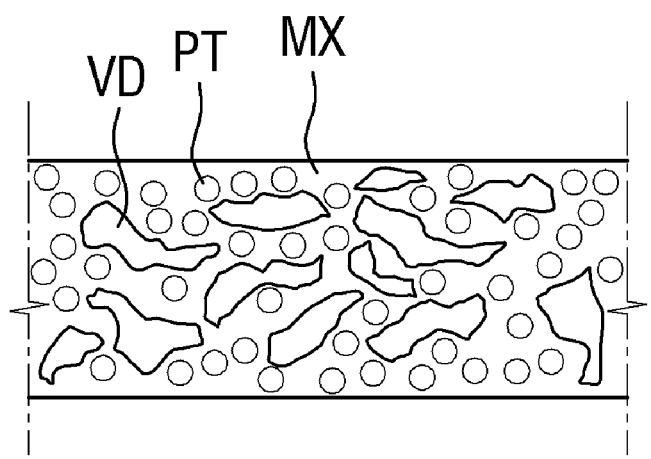
FIG. 4 and FIG. 5 are cross-sectional views illustrating various exemplary low refractive layers.
Figure 5:
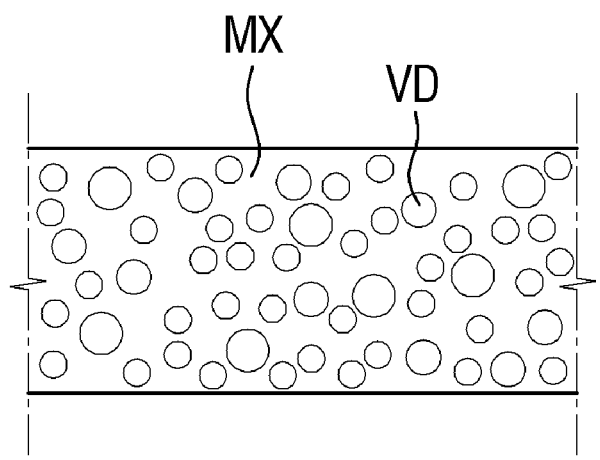

FIGS. 4 and 5 are cross-sectional views illustrating various exemplary low refractive layers.

In one exemplary embodiment, referring to FIG. 4, the first low refractive layer 20 may include particles PT, matrices MX, which surround the particles PT and are connected to one another, and voids VD. The particles PT may be fillers for controlling the refractive index and the mechanical strength of the first low refractive layer 20.

In the first low refractive layer 20, the particles PT may be dispersed in the matrices MX, gaps may be formed in the matrices MX, and the voids VD may be formed in the gaps. For example, the particles PT and the matrices MX may be mixed into a solvent, and the solvent may be dried and/or cured and may thus evaporate. Then, the voids VD may be formed between the matrices MX.

In another exemplary embodiment, referring to FIG. 5, the first low refractive layer 20 may include matrices MX and voids VD, but not particles PT. For example, the first low refractive layer 20 may include matrices MX, which are connected to one another like a foam resin, and a plurality of voids VD, which are disposed between the matrices MX.

As illustrated in FIGS. 4 and 5, in a case where the first low refractive layer 20 includes the voids VD, the total refractive index of the first low refractive layer 20 may be between the refractive index of the particles PT or the matrices MX and the refractive index of the voids VD. As described above, if the voids VD are filled with a vacuum having a refractive index of 1 or an air layer or a gas having a refractive index of substantially 1, the total refractive index of the first low refractive layer 20 may become 1.4 or lower, for example, about 1.25, even if the first low refractive layer 20 is formed of a material with a refractive index of 1.4 or higher. In one exemplary embodiment, the particles PT may be formed of an inorganic material such as $SiO_2$, $Fe_2O_3$, or $MgF_2$, and the matrices MX may be formed of an organic material such as polysiloxane. However, the inventive concepts are not limited to this exemplary embodiment.

Referring again to FIGS. 1 and 3, the first low refractive layer 20 has a first surface 20a, which faces a side surface 10s of the light guide plate 10, and a second surface 20b, which is opposite to the first surface 20a and faces the wavelength conversion layer 30. The first low refractive layer 20 may further have a first edge 20s1, which is disposed adjacent to the top surface 10a of the light guide plate 10 and extends from one side surface 10s to its opposite side surface 10s of the light guide plate 10, a third edge 20s3, which is opposite to the first edge 20s1, and second and fourth edges 20s2 and 20s4, which connect the first and third edges 20s1 and 20s3. The four edges of the first low refractive layer 20 will hereinafter be referred to as first through fourth edges 20s1 through 20s4, if necessary, or collectively as the edges 20s.

The thickness of the first low refractive layer 20, i.e., the distance between the first and second surfaces 20a and 20b of the first low refractive layer 20, may be 0.4 μm to 1 μm. In a case where the thickness of the first low refractive layer 20 is 0.4 μm or greater, which is in the range of wavelengths of visible light, the first low refractive layer 20 can form an effective optical interface with the side surfaces 10s of the light guide plate 10 and can be effective for controlling the angle of emission of light at the side surfaces 10s of the light guide plate 10 according to Snell's law. In a case where the thickness of the first low refractive layer 20 is 1 μm or less, the first low refractive layer 20 may be advantageous for reducing the size of the bezel of a display device. In one exemplary embodiment, the thickness of the first low refractive layer 20 may be about 0.5 μm.

The first low refractive layer 20 may cover most of at least one side surface 10s of the light guide plate 10 and may expose part of the edges of the at least one side surface 10s of the light guide plate 10. In other words, the top surface 10a and/or the bottom surface 10b of the light guide plate 10 may protrude beyond the edges 20s of the first low refractive layer 20. Part of the at least one side surface 10s of the light guide plate 10, exposed by the first low refractive layer 20, may provide a space in which the edges 20s of the first low refractive layer 20 can be stably covered by the passivation layer 40.

The first low refractive layer 20 may be formed by a coating method. For example, the first low refractive layer 20 may be formed by coating a composition for forming the first low refractive layer 20 on one side surface 10s of the light guide plate 10 and drying and curing the composition. The composition may be coated by slit coating, spin coating, roll coating, spray coating, inkjet printing, jet valve printing, or pad printing, but exemplary embodiments are not limited thereto. That is, the first low refractive layer 20 may be formed by various deposition methods other than coating.

The wavelength conversion layer 30 is disposed on the second surface 20b of the first low refractive layer 20. The wavelength conversion layer 30 converts the wavelength of at least some light incident thereupon. The wavelength conversion layer 30 may include a binder layer and wavelength conversion particles dispersed in the binder layer. The wavelength conversion layer 30 may further include scattering particles dispersed in the binder layer.

The binder layer, which is a medium in which the wavelength conversion particles are dispersed, may be formed of various resin compositions that can be referred to as binders, but exemplary embodiments are not limited thereto. Any type of medium that can distribute and disperse the wavelength conversion particles and/or the scattering particles therein may be referred to as the binder layer regardless of the name, additional functions, and composition thereof.

The wavelength conversion particles, which are particles converting the wavelength of incident light, may be, for example, quantum dots (QDs), a fluorescent material, or a phosphorescent material. The QDs, which are exemplary wavelength conversion particles, is a material having a crystal structure of several nanometers in size, composed of several hundreds to thousands of atoms, and exhibit a quantum confinement effect. Thus, the energy band gap of the QDs increases with a decrease in the size of the QDs. When light having a wavelength greater than the energy band gap of the QDs is incident upon the QDs, the QDs absorb the light and become excited. Then, the QDs emit light of a particular wavelength and fall to a ground state. The light emitted by the QDs has a value corresponding to the energy band gap of the QDs. By controlling the size and the composition of the QDs, the emission properties of the QDs, resulting from the quantum confinement effect, can be controlled The QDs may comprise at least one of, for example, a Group II-VI compound, a Group II-V compound, a Group III-VI compound, a Group III-V compound, a Group IV-VI compound, a group compound, a Group II-IV-VI compound, and a Group II-IV-V compound.

The QDs may comprise a core and a shell overcoating the core. The core may comprise at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si, and Ge. The shell may comprise at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, Pb Se, and PbTe.

The wavelength conversion particles may include wavelength conversion particles converting incident light into different wavelengths. For example, the wavelength conversion particles include first wavelength conversion particles, which convert incident light of a particular wavelength into a first wavelength and emit the first wavelength, and second wavelength conversion particles, which convert the incident light into a second wavelength and emit the second wavelength. In one exemplary embodiment, light emitted from the light source 400 and incident upon the wavelength conversion particles may be light having a blue wavelength, the first wavelength may be a green wavelength, and the second wavelength may be a red wavelength. For example, the blue wavelength may be a wavelength having a peak in the range of 420 nm to 470 nm, the green wavelength may be a wavelength having a peak in the range of 520 nm to 570 nm, and the red wavelength may be a wavelength having a peak in the range of 620 nm to 670 nm. However, the blue, green, and red wavelengths are not particularly limited and may be understood as encompassing ranges of wavelengths that can be perceived as blue, green, and red.

In this exemplary embodiment, some blue-wavelength light incident upon the wavelength conversion layer 30 may be incident upon the first wavelength conversion particles through the wavelength conversion layer 30 and may be converted into, and emitted as, green-wavelength light, other blue-wavelength light incident upon the wavelength conversion layer 30 may be incident upon the second wavelength conversion particles and may be converted into, and emitted as, red-wavelength light, and still other blue-wavelength light incident upon the wavelength conversion layer 30 may be emitted as is, without being incident upon the first wavelength conversion particles and the second wavelength conversion particles. Light transmitted through the wavelength conversion layer 30 may include blue-wavelength light, green-wavelength light, and red-wavelength light. By appropriately controlling the ratio of the blue-wavelength light, the green-wavelength light, and the red-wavelength light, white light or another color light may be displayed. Light converted by the wavelength conversion layer 30 is concentrated on a narrow range of wavelengths and has a sharp spectrum with a narrow half width. If colors are realized by filtering the light with the sharp spectrum using a color filter, color reproducibility can be improved.

In another exemplary embodiment, short-wavelength light such as ultraviolet (UV) light may be provided as incident light, and three types of wavelength conversion particles may be provided in the wavelength conversion layer 30 to convert the incident light into the blue, green, and red wavelengths and thus to emit white light.

The wavelength conversion layer 30 may further include scattering particles. The scattering particles, which are non-QD particles, may be particles having no wavelength conversion function. The scattering particles scatter incident light and may thus allow more light to be incident upon the wavelength conversion particles. $TiO_2$ or $SiO_2$ may be used as the scattering particles.

The wavelength conversion layer 30 has a first surface 30a, which faces the first low refractive layer 20, a second surface 30b, which is opposite to the first surface 30a, and side surfaces 30s, which connect the first and second surfaces 30a and 30b three-dimensionally. The side surfaces 30s of the wavelength conversion layer 30 may include first through fourth side surfaces 30s1 through 30s4. The first side surface 30s1 is defined as a side surface of the wavelength conversion layer 30 that is adjacent to the top surface 10a of the light guide plate 10 and extends from the second side surface 10s2 to the fourth side surface 10s4 of the light guide plate 10. The first side surface 30s1 of the wavelength conversion layer 30 may be adjacent to the first edge 20s1 of the first low refractive layer 20 and may extend in the same direction as the first edge 20s1. A side surface of the wavelength conversion layer 30 that is opposite to the first side surface 30s1 and adjacent to the bottom surface 10b of the light guide plate 10 is the third side surface 30s3, and both side surfaces of the wavelength conversion layer 30 connecting the first and third side surfaces 30s1 and 30s3 are the second and fourth side surfaces 30s2 and 30s4.

The wavelength conversion layer 30 may be thicker than the first low refractive layer 20. The thickness of the wavelength conversion layer 30 may be about 10 μm to 50 μm. In one exemplary embodiment, the thickness of the wavelength conversion layer 30 may be about 10 μm. The thickness of the wavelength conversion layer 30 refers to the distance between the first and second surfaces 30a and 30b of the wavelength conversion layer 30.

The wavelength conversion layer 30 may cover the second surface 20b of the first low refractive layer 20 and may completely overlap with the first low refractive layer 20. The first surface 30a of the wavelength conversion layer 30 may be placed in direct contact with the second surface 20b of the first low refractive layer 20.

The side surfaces 30s of the wavelength conversion layer 30 may be inclined with respect to the side surfaces 10s of the light guide plate 10. In a case where the first low refractive layer 20 is thick enough to have side surfaces, the inclination angle of the side surfaces 30s of the wavelength conversion layer 30 may be smaller than the inclination angle of the side surfaces of the first low refractive layer 20. As will be described later, in a case where the wavelength conversion layer 30 is formed by, for example, slit coating, the side surfaces 30s of the wavelength conversion layer 30, which is relatively thick, may have a smaller inclination angle than the side surfaces of the first low refractive layer 20, but exemplary embodiments are not limited thereto. That is, alternatively, the inclination angle of the side surfaces 30s of the wavelength conversion layer 30 may be substantially the same as or smaller than the inclination angle of the first low refractive layer 20 depending on how the wavelength conversion layer 30 is formed.

The wavelength conversion layer 30 may be formed by a coating method. For example, the wavelength conversion layer 30 may be formed by slit-coating a wavelength conversion composition on the light guide plate 10 with the first low refractive layer 20 formed thereon and drying and curing the wavelength conversion composition, but exemplary embodiments are not limited thereto. That is the wavelength conversion layer 30 may be formed by various deposition methods other than coating.

The passivation layer 40 is disposed on the first low refractive layer 20 and the wavelength conversion layer 30. The passivation layer 40 may prevent the infiltration of moisture and/or oxygen.

The passivation layer 40 may be formed as a single film or a multilayer film. For example, if the passivation layer 40 is a multilayer film, the passivation layer 40 may include first, second, and third passivation films 40_1, 40_2, and 40_3, which are sequentially stacked, as illustrated in FIG. 3. The sides of each of the first, second, and third passivation films 40_1, 40_2, and 40_3 may be aligned, but exemplary embodiments are not limited thereto. That is, alternatively, any one of the first, second, and third passivation films 40_1, 40_2, and 40_3 may protrude beyond the rest of the passivation layer 40. The passivation layer 40 is illustrated in FIG. 3 as having a stack of three films, but exemplary embodiments are not limited thereto. That is, alternatively, the passivation layer 40 may include two films or four or more films.

The passivation layer 40 may comprise an inorganic material. For example, the passivation layer 40 may comprise silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, or a metal film with light transmittance secured.

In one exemplary embodiment, the passivation layer 40 may be formed as a single film comprising silicon nitride.

In another exemplary embodiment, the passivation layer 40 may be formed as a multilayer film comprising silicon nitride and silicon oxide. In a case where the passivation layer 40 is a multilayer film in which silicon nitride and silicon oxide are alternately stacked, the passivation layer 40 may additionally perform the functions of a color filter, i.e., may transmit a particular wavelength therethrough and reflecting other wavelengths. However, the type of material that enables the passivation layer 40 to perform the functions of a color filter is not particularly limited. The passivation layer 40 may be able to perform the functions of a color filter as long as it has a structure in which materials having different refractive indexes are alternately stacked.

Specifically, the passivation layer 40 performing the functions of a color filter may transmit light of the first wavelength emitted from the light source 400 therethrough and may reflect light of the second and third wavelengths, which are different from the first wavelength. For example, the passivation layer 40 may transmit blue-wavelength light emitted from the light source 400 therethrough and may reflect green-wavelength light and red-wavelength light provided by the wavelength conversion layer 30. The passivation layer 40 may transmit 60% or more of light of the first wavelength and may reflect 60% or more of light of the second and third wavelengths.

In a case where the passivation layer 40 performs the functions of a color filter, rays of light scattered by the wavelength conversion layer 30 and traveling in a direction other than a direction toward the light incidence surface 10s1 can be guided toward the light incidence surface 10s1 by the passivation layer 40, and as a result, light incidence efficiency can be improved. This will be described later in further detail.

In the description that follows, the passivation layer 40 will hereinafter be described as not only preventing the infiltration of moisture and/or oxygen, but also performing the functions of a color filter.

The passivation layer 40 may completely cover at least one side of the first low refractive layer 20 and the wavelength conversion layer 30. In one exemplary embodiment, the passivation layer 40 may completely cover all side surfaces of the first low refractive layer 20 and the wavelength conversion layer 30, but exemplary embodiments are not limited thereto.

The passivation layer 40 may completely overlap with the wavelength conversion layer 30, may cover the second surface 30b of the wavelength conversion layer 30, may protrude outwardly beyond the second surface 30b of the wavelength conversion layer 30 to cover the side surfaces 30s of the wavelength conversion layer 30 and the edges 20s of the first low refractive layer 20. The passivation layer 40 may be placed in contact with the second surface 30b and the side surfaces 30s of the wavelength conversion layer 30 and the edges 20s of the first low refractive layer 20. The passivation layer 40 may extend to the edges of the light guide plate 10 that are exposed by the first low refractive layer 20, and as a result, part of the edges of the passivation layer 40 may be placed in direct contact with the side surfaces 10s of the light guide plate 10. In one exemplary embodiment, the side surfaces 40s of the passivation layer 40 may be aligned with the top surface 10a and/or the bottom surface 10b of the light guide plate 10. The inclination angle of the side surfaces 40s of the passivation layer 40 may be greater than the inclination angle of the side surfaces 30s of the wavelength conversion layer 30. In a case where the first low refractive layer 20 has side surfaces, the inclination angle of the side surfaces 40s of the passivation layer 40 may also be greater than the inclination angle of the side surfaces of the first low refractive layer 20.

The thickness of the passivation layer 40 may be smaller than the thickness of the wavelength conversion layer 30 and may be similar to, or smaller than, the thickness of the first low refractive layer 20. The thickness of the passivation layer 40 may be 0.1 µm to 2 µm. Specifically, when the thickness of the passivation layer 40 is 0.1 µm or greater, the passivation layer 40 can effectively reflect light of a particular wavelength and prevent the infiltration of moisture and/or oxygen. Also, the thickness of the passivation layer 40 may be 2 µm or smaller, which is advantages for achieving thickness reduction and improving transmittance. In one exemplary embodiment, the thickness of the passivation layer 40 may be about 0.4 µm.

The passivation layer 40 can protect the wavelength conversion layer 30, particularly the wavelength conversion particles contained in the wavelength conversion layer 30, from moisture and/or oxygen. In the case of using a wavelength conversion film, barrier films are laminated on both surfaces of the wavelength conversion layer 30 to prevent water and/or oxygen from infiltrating into the wavelength conversion layer 30. On the other hand, in the exemplary embodiment of FIGS. 1 through 3, the wavelength conversion layer 30 is provided without any barrier films, and thus, a sealing structure for protecting the wavelength conversion layer 30 is needed to replace barrier films. The sealing structure may be realized by the passivation layer 40 and the light guide plate 10.

The gates through which moisture can permeate into the wavelength conversion layer 30 include the first surface 30a, the side surfaces 30s, and the second surface 30b of the wavelength conversion layer 30. Since the side surfaces 30s and the second surface 30b of the wavelength conversion layer 30 are covered and protected by the passivation layer 40, the infiltration of moisture and/or oxygen into the wavelength conversion layer 30 can be prevented or at least reduced.

On the other hand, the first surface 30a of the wavelength conversion layer 30 is placed in contact with the second surface 20b of the first low refractive layer 20. In a case where the first low refractive layer 20 includes the voids VD or comprises an organic material, moisture or the like can move within the first low refractive layer 20. Thus, moisture and/or oxygen may penetrate into the wavelength conversion layer 30 through the first surface 30a. However, in the exemplary embodiment of FIGS. 1 through 3, since the first low refractive layer 20 is sealed, the infiltration of moisture and/or oxygen through the first surface 30a of the wavelength conversion layer 30 can be completely prevented.

Specifically, since the edges 20s of the first low refractive layer 20 are covered and protected by the passivation layer 40, the infiltration of moisture and/or oxygen through the edges 20s of the first low refractive layer 20 can be prevented or at least reduced. Even if the first low refractive layer 20 protrudes beyond the wavelength conversion layer 30 and as a result, part of the second surface 20b of the first low refractive layer 20 is exposed, the infiltration of moisture and/or oxygen through the exposed part of the first low refractive layer 20 can be prevented or at least reduced because the exposed part of the first low refractive layer 20 is covered and protected by the passivation layer 40. The first surface 20a of the first low refractive layer 20 is placed in contact with the light guide plate 10. In a case where the light guide plate 10 is formed of an inorganic material such as glass, the light guide plate 10, like the passivation layer 40, can prevent or reduce the infiltration of moisture and/or oxygen. Accordingly, since a stack consisting of the first low refractive layer 20 and the wavelength conversion layer 30 is surrounded and sealed by the passivation layer 40 and the light guide plate 10, the infiltration of moisture and/or oxygen can be prevented or at least reduced by such sealing structure, even if there are pathways for the movement of moisture and/or oxygen inside the first low refractive layer 20. As a result, the deterioration of the wavelength conversion particles that may be caused by moisture and/or oxygen can be prevented or at least reduced.

As described above, the passivation layer 40 may additionally perform the functions of a color filter. Light converted inside the wavelength conversion layer 30 may be emitted in various directions, and the passivation layer 40 may reflect the light and guide it toward the light guide plate 10. Specifically, some incident light is incident upon the wavelength conversion layer 30 and collides with the wavelength conversion particles. As a result, the incident light exhibits random scattering properties when converted and emitted by the wavelength conversion layer 30. That is, green-wavelength and red-wavelength light emitted from the wavelength conversion layer 30 after colliding with the wavelength conversion particles may travel in a direction other than a direction toward the light guide plate 10. If the passivation layer 40 is not provided, the light traveling in a direction other than the direction toward the light guide plate 10 may directly leak out of a display device and may thus be recognized as light leakage. Since blue-wavelength light emitted from the light source 400 does not collide with the wavelength conversion particles, most of the blue-wavelength light travels toward the light guide plate 10, but only some of the green-wavelength and red-wavelength light travels toward the light guide plate 10. Accordingly, the amount of light incident upon the light guide plate 10 may vary depending on the wavelength of the light. The passivation layer 40 covers the second surface 30b and the side surfaces 30s of the wavelength conversion layer 30 and can thus prevent green-wavelength and red-wavelength light from leaking out of the passivation layer 40 by reflecting green-wavelength and red-wavelength light traveling toward the second surface 30b and the side surfaces 30s of the wavelength conversion layer 30. The light reflected by the passivation layer 40 may travel toward the first surface 30a of the wavelength conversion layer 30, i.e., toward the light guide plate 10. Therefore, the amount of light incident upon the light guide plate 10 may become uniform regardless of the wavelength of the light, and as a result, light leakage can be improved.

The passivation layer 40 may be formed by a deposition method. For example, the passivation layer 40 may be formed on the light guide plate 10 where the first low refractive layer 20 and the wavelength conversion layer 30 are sequentially formed, using chemical vapor deposition (CVD), but exemplary embodiments are not limited thereto. That is, the passivation layer 40 may be formed by various deposition methods other than CVD.

As described above, the optical member 100 is a single integral member capable of performing both an optical guide function and a wavelength conversion function at the same time. Since the optical member 100 is a single integral member, the assembly of a display device can be simplified. Also, since in the optical member 100, the first low refractive layer 20 is disposed on one side surface 10s of the light guide plate 10, for example, the light incidence surface 10s1, the angle of emission of light incident upon the light guide plate 10 can be controlled so that total internal reflection can effectively take place at the top surface 10a and/or the bottom surface 10b of the light guide plate 10. By sealing the first low refractive layer 20 and the wavelength conversion layer 30 with the passivation layer 40, the deterioration of the wavelength conversion layer 30 can be prevented, and light incidence efficiency for the light guide plate 10 can be improved, especially when the passivation layer 40 additionally performs the functions of a color filter.

The wavelength conversion layer 30 of the optical member 100 and its sealed structure contribute to lowering the manufacturing cost of the optical member 100 and reducing the size of the bezel of a display device, compared to a typical wavelength conversion film. For example, in the case of using a wavelength conversion film, barrier films are attached to both surfaces of the wavelength conversion layer 30. However, the barrier films are expensive and are generally as thick as 110 μm or greater, in which case, the thickness of the wavelength conversion film amounts to about 270 μm. On the other hand, since in the optical member 100, the first low refractive layer 20 may be formed to a thickness of about 0.5 μm and the passivation layer 40 may be formed to a thickness of about 0.4 μm, the thickness of the optical member 100 can be maintained to be as small as about 0.6 mm, and as a result, the size of the bezel of a display device including the optical member 100 can be reduced. Also, since the optical member 100 does not require expensive barrier films, the manufacturing cost of the optical member 100 can be maintained to be as low as, or below, the manufacturing cost of a wavelength conversion film.

Optical members according to other exemplary embodiments will hereinafter be described, focusing mainly on differences with the optical member 100 according to the exemplary embodiment of FIGS. 1 through 3. Some of FIGS. 6 through 23 illustrate a structure of arrangement/alignment of elements in each optical member, as viewed from one side surface of each optical member, but the illustrated side surface structures may directly apply to more than one side surface or all the side surfaces of each optical member, or may be used in combination with various other side surface structures. These side surface structures may be obtained intentionally or unintentionally during manufacturing.

FIGS. 6 through 10 are cross-sectional views of optical members according to other exemplary embodiments. FIGS. 6 through 10 show that the arrangement/alignment of elements in each optical member can be modified in various manners without departing from the scope of the inventive concepts.

Figure 6:
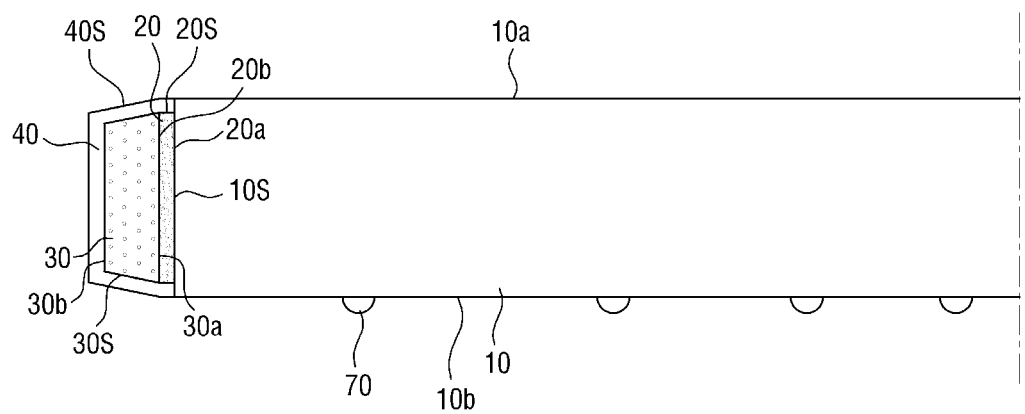
FIG. 6, FIG. 7, FIG. 8, FIG. 9 and FIG. 10 are cross-sectional views of optical members according to other exemplary embodiments.

FIG. 6 illustrates an optical member 101 in which side surfaces 40s of a passivation layer 40 may be aligned substantially on the same planes as a top surface 10a and/or a bottom surface 10b of a light guide plate 10. For example, referring to FIG. 6, the planes where the side surfaces 40s of the passivation layer 40 are arranged may be substantially aligned with the planes where the top surface 10a and/or the bottom surface 10b of the light guide plate 10 are arranged.

For example, if the width of part of a side surface 10s of the light guide plate 10 exposed by a first low refractive layer 20 is similar to the thickness of the passivation layer 40, the side surfaces 40s of the passivation layer 40 may be disposed on the same planes as the top surface 10a and/or the bottom surface 10b of the light guide plate 10. That is, in the exemplary embodiment of FIG. 6, each of the side surfaces 40s of the passivation layer 40 may extend substantially over a single plane, whereas in the exemplary embodiment of FIG. 2, each of the side surfaces 40s is disposed discontinuously over two different planes.

Figure 7:
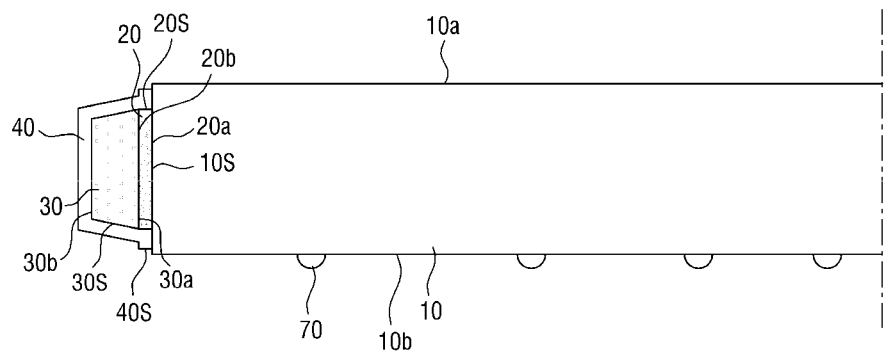

FIG. 7 illustrates an optical member 102 in which a passivation layer 40 does not entirely cover part of a side surface 10s of a light guide plate 10 exposed by a first low refractive layer 20. That is, in the exemplary embodiment of FIG. 7, unlike in the exemplary embodiment of FIG. 3, side surfaces 40s of the passivation layer 40 are not aligned with a top surface 10a and/or a bottom surface 10b of the light guide plate 10 but positioned inside the top surface 10a and/or the bottom surface 10b of the light guide plate 10. This structure of the optical member 102 may be obtained by depositing a passivation material for forming the passivation layer 40 with a predetermined margin from the top surface 10a and/or the bottom surface 10b of the light guide plate 10 in order to prevent the passivation material from being deposited on the top surface 10a and/or the bottom surface 10b of the light guide plate 10. Even in this case, a sealing structure can be provided and maintained as long as the passivation layer 40 covers both the wavelength conversion layer 30 and the first low refractive layer 20.

Figure 8:
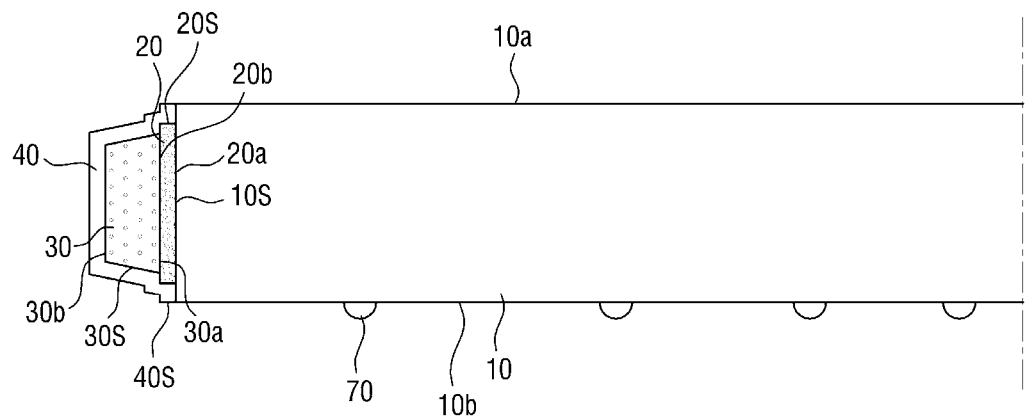
Figure 9:
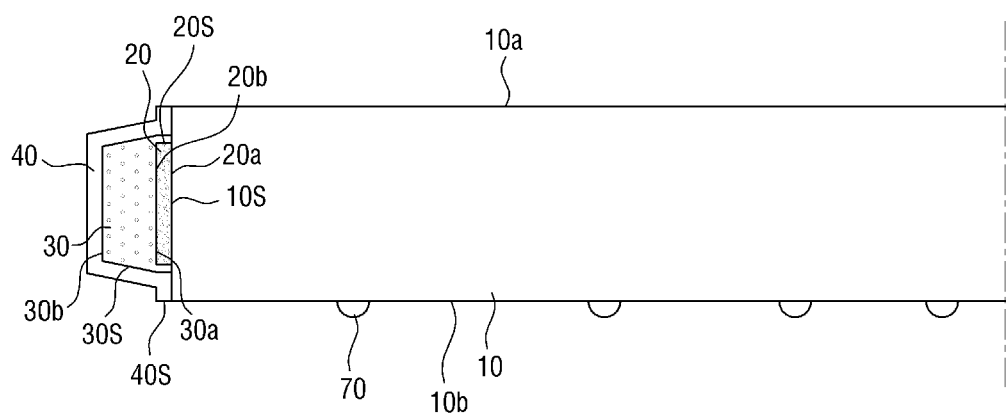

FIGS. 8 and 9 illustrate optical members 103 and 104, respectively, in which edges 20s of a first low refractive layer 20 are not aligned with side surfaces 30s of a wavelength conversion layer 30.

For example, referring to FIG. 8, the side surfaces 30s of the wavelength conversion layer 30 may be positioned inside the edges 20s of the first low refractive layer 20. That is, the first low refractive layer 20 may protrude outwardly beyond the side surfaces 30s of the wavelength conversion layer 30. This structure of the optical member 103 may be obtained by forming the wavelength conversion layer 30 with a predetermined margin from the edges 20s of the first low refractive layer so that the wavelength conversion layer 30 can be stably disposed on the first low refractive layer 20, which improves the efficiency of total internal reflection. Even in this case, a sealing structure can be provided and maintained as long as the passivation layer 40 covers both the wavelength conversion layer 30 and the first low refractive layer 20.

In another example, referring to FIG. 9, the wavelength conversion layer 30 may protrude outwardly beyond the edges 20s of the first low refractive layer 20. The wavelength conversion layer 30 may cover the edges 20s of the first low refractive layer 20 and may be placed in direct contact with part of a side surface 10s of a light guide plate 10. Even in this case, a sealing structure can be provided and maintained as long as the passivation layer 40 covers both the wavelength conversion layer 30 and the first low refractive layer 20. In the exemplary embodiment of FIG. 9, the angle of emission of light may not be controlled at the edges of the optical member 104 where the wavelength conversion layer 30 is placed in direct contact with the side surface 10s of the light guide plate 10, but may be useful when a light transmission blocking pattern or another light-shielding member is applied on the edges of a top surface 10a of the light guide plate 10 from a side. A reflective member may be disposed on a bottom surface 10b of the light guide plate 10, in which case, light leaking out of the light guide plate 10 through the bottom surface 10b, instead of being totally reflected, may be guided back into the light guide plate 10.

Figure 10:
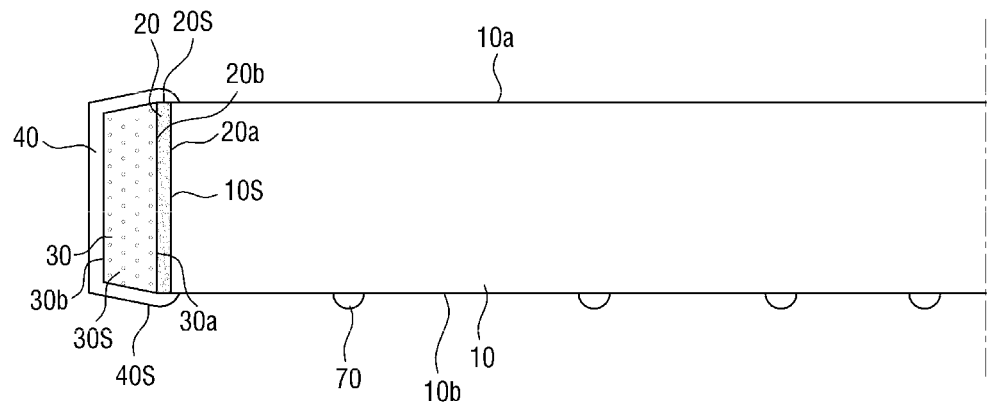

FIG. 10 illustrates an optical member 105 in which side surfaces 40s of a passivation layer 40 protrude outwardly beyond a top surface 10a and/or a bottom surface 10b of a light guide plate 10. For example, referring to FIG. 10, edges 20s of a first low refractive layer 20 may be aligned with the top surface 10a and/or the bottom surface 10b of the light guide plate 10, and the passivation layer 40 may extend outwardly beyond the edges 20s of the first low refractive layer 20 and may thus cover the edges 20s of the first low refractive layer 20. In one exemplary embodiment, the passivation layer 40 may cover part of a side surface 10s of the light guide plate 10. Even in this case, a sealing structure can be provided and maintained as long as the passivation layer 40 covers both the wavelength conversion layer 30 and the first low refractive layer 20. The optical member 105 of FIG. 10 may be advantageous for maximizing a wavelength conversion function and an emission angle control function of an optical member. Although not specifically illustrated, the passivation layer 40 may protrude outwardly beyond the top surface 10a and/or the bottom surface 10b of the light guide plate 10 even when the first low refractive layer 20 is positioned inside the top surface 10a and/or the bottom surface 10b of the light guide plate 10, as illustrated in FIG. 3.

Figure 11:
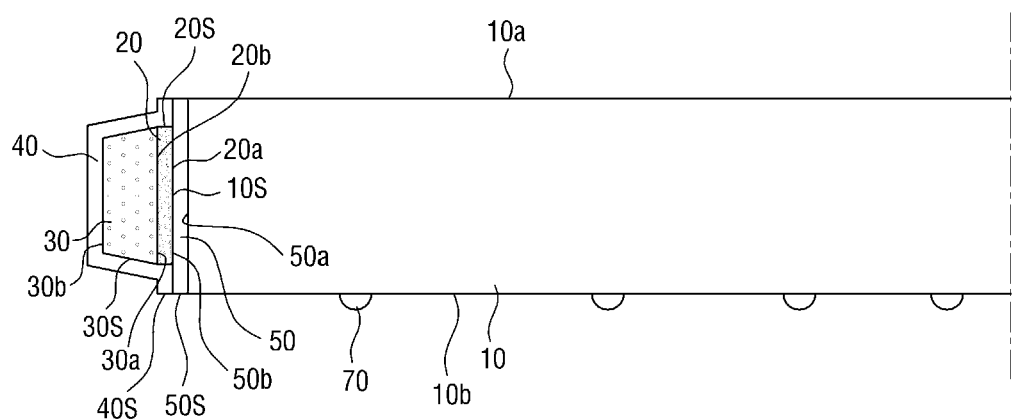
FIG. 11 is a cross-sectional view of an optical member according to another exemplary embodiment.

FIG. 11 is a cross-sectional view of an optical member according to another exemplary embodiment.

An optical member 106 of FIG. 11 differs from the optical member 100 of FIG. 3 in that it further includes a barrier layer 50 disposed on a side surface 10s of a light guide plate 10. From the perspective of the arrangement of elements, the side surface 10s of the light guide plate 10 may be replaced with a second surface 50b of the barrier layer 50 in the current embodiment.

Referring to FIG. 11, the barrier layer 50 is disposed on the side surface 10s of the light guide plate 10, and a first low refractive layer 20, a wavelength conversion layer 30, and a passivation layer 40 are sequentially stacked on the second surface 50b of the barrier layer 50. Side surfaces 50s of the barrier layer 50 may be aligned with a top surface 10a and/or a bottom surface 10b of the light guide plate 10.

The first low refractive layer 20 is formed to be in contact with the second surface 50b of the barrier layer 50. The first low refractive layer 20 may expose part of the edges of the barrier layer 50. The wavelength conversion layer 30 is disposed on the first low refractive layer 20 and completely covers the first low refractive layer 20 and the wavelength conversion layer 30. The passivation layer 40 completely overlaps with the wavelength conversion layer 30 and extends outwardly beyond the wavelength conversion layer 30 to cover side surfaces 30s of the wavelength conversion layer 30 and the edges 20s of the first low refractive layer 20. The passivation layer 40 may extend even to part of the second surface 50b of the barrier layer 50 exposed by the first low refractive layer 20, and as a result, some of the edges of the passivation layer 40 may be placed in direct contact with the second surface 50b of the barrier layer 50.

The barrier layer 50, like the passivation layer 40, prevents the infiltration of moisture and/or oxygen. The barrier layer 50 may comprise an inorganic material. For example, the barrier layer 50 may comprise silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, or a metal film with light transmittance secured. The barrier layer 50 may be formed of the same material as the passivation layer 40, but exemplary embodiments are not limited thereto. The barrier layer 50 may be formed by a deposition method such as CVD.

The thickness of the barrier layer 50 may be similar to the thickness of the passivation layer 40. For example, the thickness of the barrier layer 50 may be 0.1 µm to 2 µm.

In order for the optical member 106 to properly perform its light guide function, the refractive index of the barrier layer 50 may be substantially the same as, but may differ from, the refractive index of the light guide plate 10.

For example, if the refractive index of the barrier layer 50 is the same as the refractive index of the light guide plate 10, light does not change its direction upon arriving at the interface between the light guide plate 10 and the barrier layer 50 because it does not perceive the interface between the light guide plate 10 and the barrier layer 50 as an optical interface. Accordingly, the light guide plate 10 and the barrier layer 50 may perform together substantially the same light guide function as the light guide plate 10 of FIG. 3.

If the refractive index of the barrier layer 50 is lower than the refractive index of the light guide plate 10, the barrier layer 50 may perform a similar function to the first low refractive layer 20. That is, since the angle of emission of light transmitted through the barrier layer 50 decreases, the efficiency of total internal reflection at the top surface 10a and/or the bottom surface 10b of the light guide plate 10 can be maintained.

In order to maintain similar light guide properties to those of the optical member 100 of FIG. 3, the barrier layer 50 may be formed to be thinner than the wavelength of visible light. For example, the barrier layer 50 may be formed to a thickness of 0.4 µm, particularly, in the range of 0.1 µm to 0.4 µm. In this example, no optical interfaces are formed between the light guide plate 10 and the barrier layer 50 and between the barrier layer 50 and the first low refractive layer 20, and as a result, similar light guide properties to those of the optical member 100 of FIG. 3 can be provided regardless of the refractive index of the barrier layer 50. The thickness of the barrier layer 50 may be set to 0.3 µm to 0.4 µm in consideration of the moisture/oxygen infiltration prevention performance thereof.

As described above, a sealing structure for the wavelength conversion layer 30 can be realized by the passivation layer 40 and the barrier layer 50. Thus, even if the moisture/oxygen infiltration prevention function of the light guide plate 10 is not sufficient, the infiltration of moisture and/or oxygen can be effectively prevented by the barrier layer 50. Accordingly, the freedom of selection of the material of the light guide plate 10 may increase. For example, even if a polymer resin such as polymethyl methacrylate (PMMA), polycarbonate (PC), an acrylic resin or the like is used, instead of an inorganic material such as glass, as the material of the light guide plate 10, the barrier layer 50 can prevent the infiltration of moisture and/or oxygen and can thus prevent the deterioration of the wavelength conversion layer 30.

Figure 12:
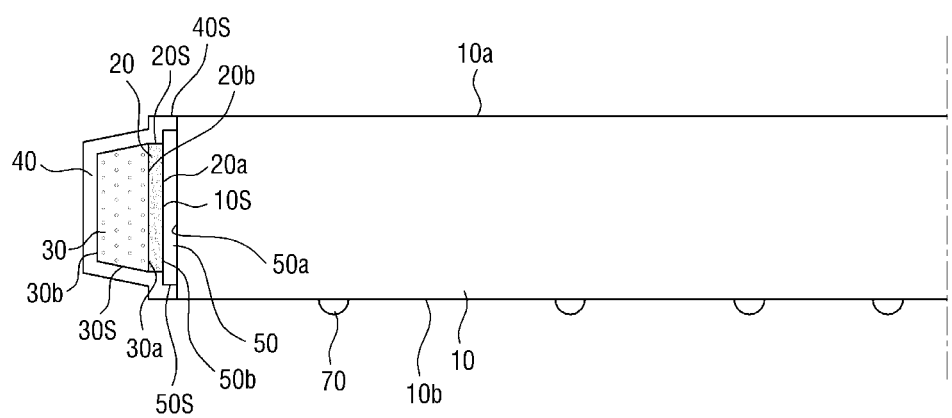
FIG. 12 is a cross-sectional view of an optical member according to another exemplary embodiment.

FIG. 12 is a cross-sectional view of an optical member according to another exemplary embodiment. FIG. 12 illustrates an optical member 107 in which a barrier layer 50 does not necessarily cover an entire side surface 10s of a light guide plate 10. That is, in the exemplary embodiment of FIG. 12, unlike in the exemplary embodiment of FIG. 11, side surfaces 50s of the barrier layer 50 may be positioned inside a top surface 10a and/or a bottom surface 10b of the light guide plate 10, instead of being aligned with the top surface 10a and/or the bottom surface 10b of the light guide plate 10. The barrier layer 50 exposes the edges of the side surface 10s of the light guide plate 10. Edges 20s of the first low refractive layer 20 may be aligned with the side surfaces 50s of the barrier layer 50 or may be positioned inside the side surfaces 50s of the barrier layer 50. That is, the first low refractive layer 20 may not protrude beyond the side surfaces 50s of the barrier layer 50.

A passivation layer 40 completely overlaps with the wavelength conversion layer 30 and extends outwardly beyond the wavelength conversion layer 30 to cover the edges 20s of the first low refractive layer 20. Also, the passivation layer 40 covers part of a second surface 50b of the barrier layer 50 exposed by the first low refractive layer 20. Also, the passivation layer 40 may extend even to part of a side surface 10s of the light guide plate 10 exposed by the barrier layer 50.

In the exemplary embodiment of FIG. 12, the barrier layer 50 does not cover the entire side surface 10s of the light guide plate 10, but can maintain a sealing structure by being placed in contact with the passivation layer 40 along the edges of the optical member 107. Accordingly, in the exemplary embodiment of FIG. 12, like in the exemplary embodiment of FIG. 11, the freedom of selection of the material of the light guide plate 10 may increase.

Figure 13:
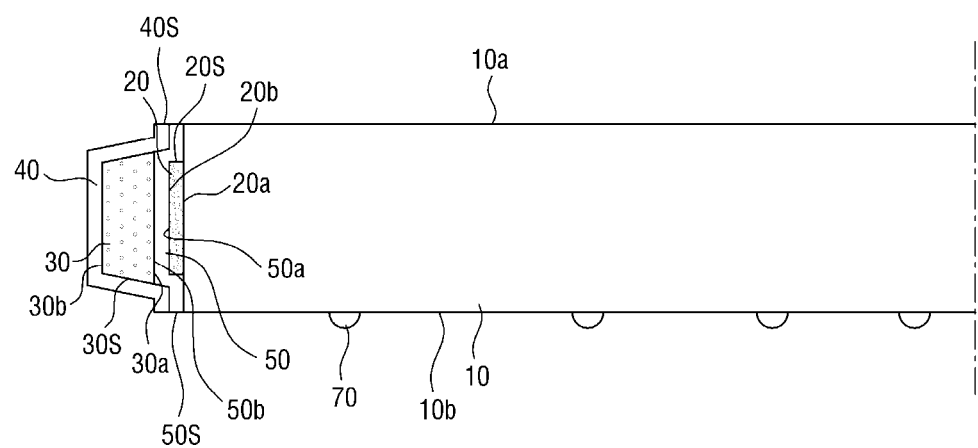
FIG. 13, FIG. 14 and FIG. 15 are cross-sectional views of optical members according to other exemplary embodiments.
Figure 14:
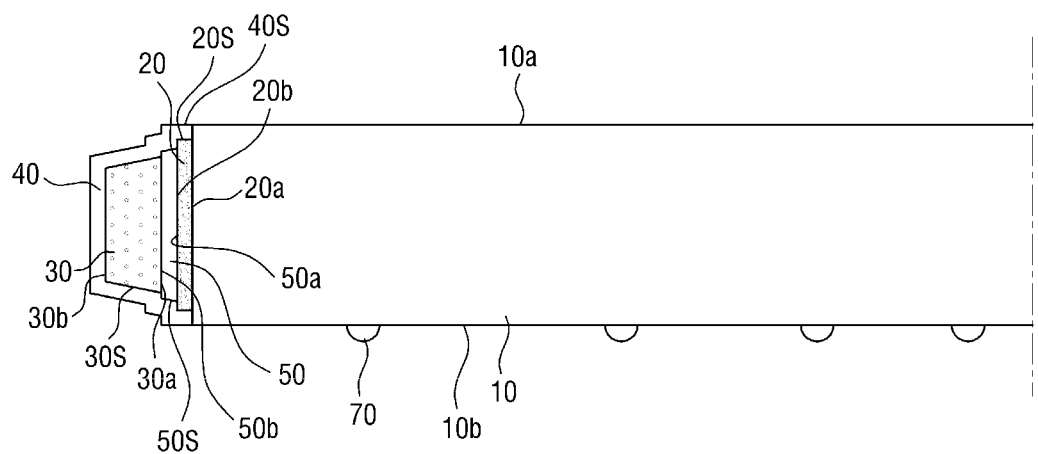
Figure 15:
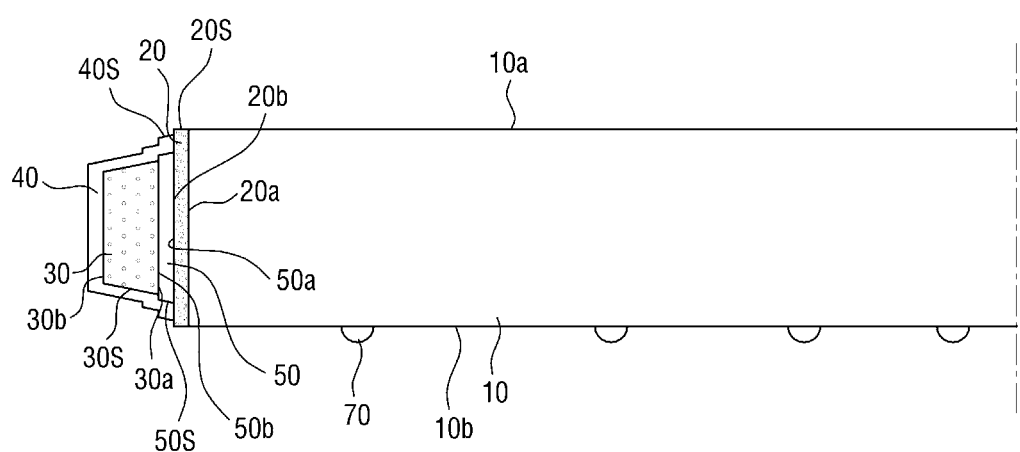

FIGS. 13 through 15 are cross-sectional views of optical members according to other exemplary embodiments. FIGS. 13 through 15 illustrate optical members 108, 109, and 110, respectively, in which a barrier layer 50 is formed on a first low refractive layer 20.

Referring to FIG. 13, the first low refractive layer 20 is disposed on a side surface 10s of a light guide plate 10. The first low refractive layer 20 covers most of the side surface 10s of the light guide plate 10 but exposes some of the edges of the light guide plate 10.

The barrier layer 50 is disposed on a second surface 20b of the first low refractive layer 20. The barrier layer 50 completely covers the first low refractive layer 20. The barrier layer 50 may extend even to part of the side surface 10s of the light guide plate 10 exposed by the first low refractive layer 20.

A wavelength conversion layer 30 is disposed on a second surface 50b of the barrier layer 50. The wavelength conversion layer 30 exposes the edges of the barrier layer 50, and side surfaces 30s of the wavelength conversion layer 30 may be aligned with edges 20s of the first low refractive layer 20 or may be positioned inside the edges 20s of the first low refractive layer 20. That is, the wavelength conversion layer 30 may not protrude beyond the edges 20s of the first low refractive layer 20.

A passivation layer 40 is disposed on the wavelength conversion layer 30. The passivation layer 40 may cover the second surface 30b and the side surfaces 30s of the wavelength conversion layer 30 and may extend outwardly beyond the wavelength conversion layer 30 to be placed in contact with exposed portions of the second surface 50b.

FIG. 13 illustrates side surfaces 50s of the barrier layer 50 and side surfaces 40s of the passivation layer 40 as being aligned with a top surface 10a and/or a bottom surface 10b of the light guide plate 10, but alternatively, the side surfaces 50s of the barrier layer 50, the side surfaces 40s of the passivation layer 40, or both may be positioned inside the top surface 10a and/or the bottom surface 10b of the light guide plate 10.

The optical member 109 of FIG. 14 differs from the optical member 108 of FIG. 13 in that a first low refractive layer 20 is not completely covered by a barrier layer 50 and part of the first low refractive layer 20 not covered by the barrier layer 50 is covered by a passivation layer 40.

Referring to FIG. 14, the barrier layer 50 is disposed on a second surface 20b of the first low refractive layer 20 and exposes at least edges 20s of the first low refractive layer 20. Side surfaces 50s of the barrier layer 50 may be aligned with the edges 20s of the first low refractive layer 20 or may be positioned inside the edges 20s of the first low refractive layer 20. That is, the side surfaces 50s of the barrier layer 50 may not protrude beyond the edges 20s of the first low refractive layer 20. A wavelength conversion layer 30 is disposed on a second surface 50b of the barrier layer 50, and a passivation layer 40 is disposed on the wavelength conversion layer 30. Side surfaces 30s of the wavelength conversion layer 30 may be aligned with the side surfaces 50s of the barrier layer 50 or may be positioned inside the side surfaces 50s of the barrier layer 50. That is, the wavelength conversion layer 30 may not protrude beyond the side surfaces 50s of the barrier layer 50. The passivation layer 40 covers a second surface 30b and side surfaces 30s of the wavelength conversion layer 30. The passivation layer 40 may extend outwardly beyond the wavelength conversion layer 30 to cover the side surfaces 50s of the barrier layer 50 and exposed portions of the edges 20s of the first low refractive layer 20 and to be placed in contact even with the side surface 10s of the light guide plate 10.

The optical member 110 of FIG. 15 differs from the optical member 107 or 108 of FIG. 12 or 13 in that a first low refractive layer 20 is not completely covered by a barrier layer 50 and a passivation layer 40.

Referring to FIG. 15, the first low refractive layer 20 is disposed on a side surface 10s of a light guide plate 10, and the barrier layer 50 is disposed on a second surface 20b of the first low refractive layer 20 to expose at least edges 20s of the first low refractive layer 20. Side surfaces 50s of the barrier layer 50 may be aligned with the edges 20s of the first low refractive layer 20 or may be positioned inside the edges 20s of the first low refractive layer 20. A wavelength conversion layer 30 is disposed on a second surface 50b of the barrier layer 50, and the passivation layer 40 is disposed on the wavelength conversion layer 30. Side surfaces 30s of the wavelength conversion layer 30 may be aligned with the side surfaces 50s of the barrier layer 50 or may be positioned inside the side surfaces 50s of the barrier layer 50. That is, the wavelength conversion layer 30 may not protrude beyond the side surfaces 50s of the barrier layer 50. The passivation layer 40 covers a second surface 30b and side surfaces 30s of the wavelength conversion layer 30. The wavelength conversion layer 30 may extend outwardly to be placed in contact even with a first surface 50a of the barrier layer 50. Side surfaces 40s of the passivation layer 40 may be aligned with the edges 20s of the first low refractive layer 20 or may be positioned inside the edges 20s of the first low refractive layer 20.

In the exemplary embodiments of FIGS. 13 and 14, since the first low refractive layer 20 is disposed on the side surface 10s of the light guide plate 10, the efficiency of total internal reflection within the light guide plate 10 can be maintained. Also, since the first surface 30a, the side surfaces 30s, and the second surface 30b of the wavelength conversion layer 30 are sealed with the barrier layer 50 and the passivation layer 40, the deterioration of the wavelength conversion layer 30 can be prevented. Even if the edges 20s of the first low refractive layer 20 are exposed, instead of being covered by the barrier layer 50 or the passivation layer 40, as illustrated in FIG. 15, a sealing structure for the wavelength conversion layer 30 can be maintained.

FIGS. 16 and 17 are cross-sectional views of optical members according to other exemplary embodiments. FIGS. 16 and 17 illustrate optical members 111 and 112, respectively, in which corner surfaces 11r are formed on a light guide plate 11.

Referring to FIGS. 16 and 17, the light guide plate 11 includes a top surface 11a, a bottom surface 11b, and a side surface 11s, and further includes the corner surfaces 11r, which are disposed between the side surface 11s and the top surface 11a and/or the bottom surface 11b. The top surface 11a and/or the bottom surface 11b of the light guide plate 11 meet first sides of the corner surfaces 11r, and the side surface 11s of the light guide plate 11 meets second sides of the corner surfaces 11r. The corner surfaces 11r are inclined with respect to the top surface 11a and/or the bottom surface 11b and the side surface 11s. The angles that the corner surfaces 11r and the top surface 11a and/or the bottom surface 11b form with each other may be smaller than the angles that the top surface 11a and/or the bottom surface 11b and the side surface 11s form with each other. The angles that the corner surfaces 11r and the top surface 11a and/or the bottom surface 11b form with each other and the angles that the top surface 11a and/or the bottom surface 11b and the side surface 11s form with each other may be obtuse angles. For example, the angles that the corner surfaces 11r and the top surface 11a and/or the bottom surface 11b form with each other and the angles that the top surface 11a and/or the bottom surface 11b and the side surface 11s form with each other may be about 135°.

The corner surfaces 11r can alleviate the sharpness of the corners of the light guide plate 11 and can protect the light guide plate 11 against breakage that may be caused by an external impact. The corner surfaces 11r may be flat or curved.

FIG. 16 illustrates an example in which the corner surfaces 11r are covered by a passivation layer 40. Referring to FIG. 16, a first low refractive layer 20 is disposed on the side surface 11s of the light guide plate 11 and exposes the corner surfaces 11r. Edges 20s of the first low refractive layer 20 may be aligned with sides of the first side surface 11s of the light guide plate 11 or may be positioned inside the sides of the first side surface 11s of the light guide plate 11. That is, the first low refractive layer 20 may not overlap with the corner surfaces 11r of the light guide plate 11. A wavelength conversion layer 30 is disposed on a second surface 20b of the first low refractive layer 20, and the passivation layer 40 is disposed on the wavelength conversion layer 30. Side surfaces 30s of the wavelength conversion layer 30 may be aligned with the edges 20s of the first low refractive layer 20 or may be positioned inside the edges 20s of the first low refractive layer 20. That is, the side surfaces 30s of the wavelength conversion layer 30 may not overlap with the corner surfaces 11r of the light guide plate 11. The passivation layer 40 covers a second surface 30b and the side surfaces 30s of the wavelength conversion layer 30. The passivation layer 40 extends outwardly beyond the wavelength conversion layer 30 to cover the edges 20s of the first low refractive layer 20 and the corner surfaces 11r of the light guide plate 11.

The optical member 112 of FIG. 17 differs from the optical member 111 of FIG. 16 in that corner surfaces 11r are covered by a first low refractive layer 20.

Referring to FIG. 17, the first low refractive layer 20 may be disposed on a side surface 11s of a light guide plate 11 and may extend outwardly beyond the side surface 11s of the light guide plate 11 to cover the corner surfaces 11r of the light guide plate 11. Edges 20s of the first low refractive layer 20 may be aligned with a top surface 11a and/or a bottom surface 11b of the light guide plate 11 or may be positioned inside the top surface 11a and/or the bottom surface 11b of the light guide plate 11, particularly, on the corner surfaces 11r. A wavelength conversion layer 30 may be disposed to overlap with the corner surfaces 11r of the light guide plate 11. Side surfaces 30s of the wavelength conversion layer 30 may be aligned with the edges 20s of the first low refractive layer 20 or may be positioned inside the edges 20s of the first low refractive layer 20. A passivation layer 40 covers a second surface 30b and the side surfaces 30s of the wavelength conversion layer 30 and extends outwardly beyond the wavelength conversion layer 30 to cover the edges 20s of the first low refractive layer 20. In one exemplary embodiment, the passivation layer 40 may cover part of the top surface 11a and/or the bottom surface 11b of the light guide plate 11. Even in this exemplary embodiment, a sealing structure can be maintained as long as the passivation layer 40 covers both the wavelength conversion layer 30 and the first low refractive layer 20. The optical member 112 of FIG. 17 may be advantageous for maximizing an effective optical guide area.

Figure 18A:
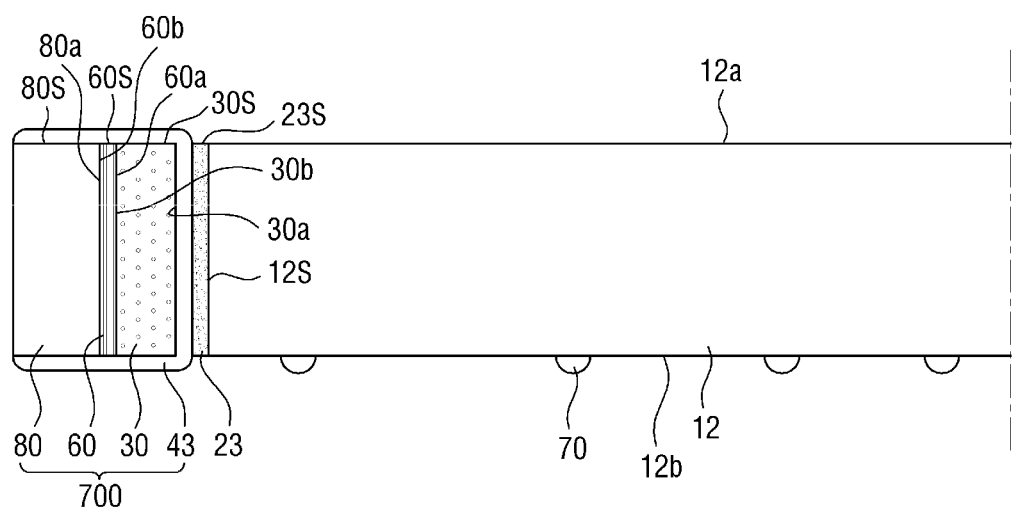
FIG. 18A is a cross-sectional view of an optical member according to another exemplary embodiment.

FIG. 18A is a cross-sectional view of an optical member according to another exemplary embodiment.

FIG. 18A illustrates an optical member 113 in which an additional wavelength conversion portion 700 can be coupled to a side surface 12s of a light guide plate 12. Referring to FIG. 18A, the optical member 113 may include a color filter layer 60, which is disposed on a base member 80, a wavelength conversion layer 30, which is disposed on the color filter layer 60, and a passivation layer 43, which covers the color filter layer 60 and the wavelength conversion layer 30.

The base member 80 may have the same refractive index as, or a similar refractive index to, the light guide plate 12. The base member 80 may comprise the same material as the light guide plate 12. For example, in a case where the base member 80 is formed of an inorganic material such as glass, the base member 80 can perform the function of preventing the infiltration of moisture and/or oxygen.

The color filter layer 60 is disposed on a first surface 80a of the base member 80. The color filter layer 60 transmits light of a particular wavelength therethrough and reflects light of other wavelengths. For example, in a case where light emitted from the light source 400 and incident upon wavelength conversion particles is blue-wavelength light, the color filter layer 60 may transmit blue-wavelength light therethrough and may reflect red- and green-wavelength light.

Side surfaces 60s of the color filter layer 60 may be aligned with side surfaces 80s of the base member 80 over substantially the same planes. The wavelength conversion layer 30 is disposed on a first surface 60a of the color filter layer 60. Side surfaces 30s of the wavelength conversion layer 30 may be aligned with the side surfaces 60s of the color filter layer 60 over substantially the same planes. That is, in the exemplary embodiment of FIG. 18A, unlike in the exemplary embodiment of FIG. 3, the side surfaces 30s of the wavelength conversion layer 30 may not be inclined and may perpendicularly intersect a first surface 30a of the wavelength conversion layer 30. In this case, the side surfaces 80s of the base member 80, the side surfaces 60s of the color filter layer 60, and the side surfaces 30s of the wavelength conversion layer 30 may be aligned with one another over substantially the same planes. Also, the side surfaces 80s of the base member 80, the side surfaces 60s of the color filter layer 60, and the side surfaces 30s of the wavelength conversion layer 30 may be aligned with a top surface 12a and/or a bottom surface 12b of the light guide plate 12 over substantially the same planes.

The passivation layer 43 is disposed on the first surface 30a of the wavelength conversion layer 30. The passivation layer 43 covers the first surface 30a and the side surfaces 30s of the wavelength conversion layer 30. The passivation layer 43 may extend outwardly beyond the wavelength conversion layer 30 to cover the side surfaces 80s of the base member 80, but exemplary embodiments are not limited thereto. That is, alternatively, the passivation layer 43 may only partially cover the side surfaces 80s of the base member 80.

A sealing structure for the wavelength conversion layer 30 can be realized by the passivation layer 43 and the base member 80. In the exemplary embodiment of FIG. 18A, unlike in the exemplary embodiment of FIG. 3, the light guide plate 12 does not contribute to the sealing structure for the wavelength conversion layer 30. Accordingly, the freedom of selection of the material of the light guide plate 12 may increase.

The passivation layer 43, unlike the passivation layer 40 of FIG. 3, may not perform the functions of a color filter. For example, the passivation layer 43 may transmit light of all wavelengths emitted from the wavelength conversion layer 30 therethrough, but exemplary embodiments are not limited thereto. That is, alternatively, the passivation layer 43 may perform the functions of a color filter capable of controlling the ratio of light of various wavelengths emitted from the wavelength conversion layer 30.

A first low refractive layer 23 is disposed between the passivation layer 43 and the light guide plate 12. The first low refractive layer 23 may be a bonding layer coupling the passivation layer 43 and the light guide plate 12. In one exemplary embodiment, the first low refractive layer 23 not only couples the passivation layer 43 and the light guide plate 12, but also forms an optical interface between the passivation layer 43 and the first low refractive layer 23 and between the first low refractive layer 23 and the light guide plate 12 so that optical modulation such as refraction or reflection can take place. That is, the first low refractive layer 23 controls the angle of emission of light incident upon the light guide plate 12 and can thus allow total internal reflection to effectively take place at the top surface 12a and/or the bottom surface 12b of the light guide plate 12.

The first low refractive layer 23 may be placed in direct contact with a side surface 12s of the light guide plate 12, and edges 23s of the first low refractive layer 23 may be aligned with the top surface 12a and/or the bottom surface 12b of the light guide plate 12, but exemplary embodiments are not limited thereto. That is, alternatively, the first low refractive layer 23 may extend outwardly beyond the side surface 12s of the light guide plate 12 to overlap with part of the edges of the top surface 12a and/or the bottom surface 12b of the light guide plate 12.

The side surfaces 80s of the base member 80, the side surfaces 60s of the color filter layer 60, and the side surfaces 30s of the wavelength conversion layer 30 may be cut surfaces. The wavelength conversion portion 700 may be obtained by cutting a mother wavelength conversion portion illustrated in FIG. 18B.

Figure 18B:
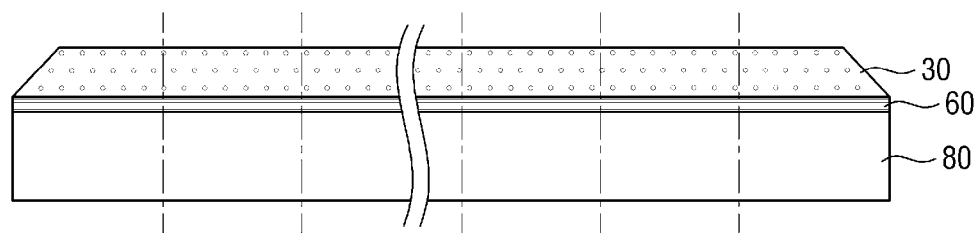
FIG. 18B is a cross-sectional view of a mother wavelength conversion portion according to an exemplary embodiment.

FIG. 18B is a cross-sectional view of a mother wavelength conversion portion. Referring to FIG. 18B, a mother wavelength conversion portion in which a color filter layer 60 and a wavelength conversion layer 30 are stacked on a base member 80 is prepared. The mother wavelength conversion portion may be cut into a plurality of segments, and a passivation layer 43 may be placed on each of the segments, thereby obtaining an individual wavelength conversion portion 700. The passivation layer 43 may be formed on each of the segments by a method such as deposition.

The individual wavelength conversion portion 700 including the passivation layer 43 may be coupled to a side surface 12s of a light guide plate 12 via a first low refractive layer 23. In this case, unlike in the exemplary embodiment of FIG. 3, a wavelength conversion layer 30 may not be formed directly on the light guide plate 12.

Figure 19:
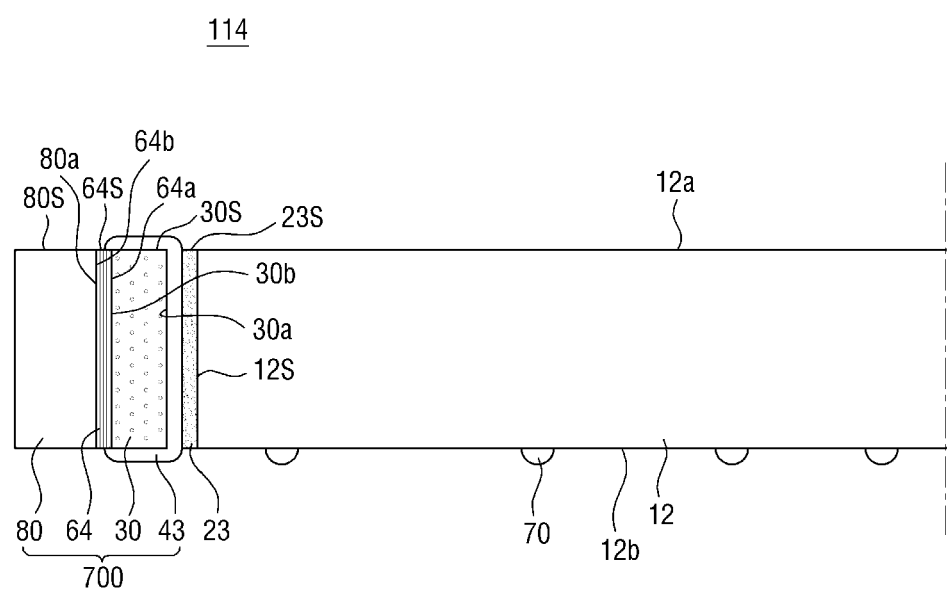
FIG. 19 is a cross-sectional view of an optical member according to another exemplary embodiment.

FIG. 19 is a cross-sectional view of an optical member according to another exemplary embodiment.

An optical member 114 of FIG. 19 differs from the optical member 113 of FIG. 18A in that a passivation layer 43 does not overlap with a base member 80.

Referring to FIG. 19, the passivation layer 43 may cover a first surface 30a and side surfaces 30s of a wavelength conversion layer 30 and may extend outwardly beyond the wavelength conversion layer 30 to cover part of side surfaces 64s of a color filter layer 64. FIG. 19 illustrates the passivation layer 43 as exposing part of the side surfaces 64s of the color filter layer 64, but exemplary embodiments are not limited thereto. That is, alternatively, the passivation layer 43 may cover the entire side surfaces 64s of the color filter layer 64. Even in this case, the passivation layer 43 may not overlap with the base member 80.

In the exemplary embodiment of FIG. 19, the color filter layer 64 may additionally perform the function of preventing the infiltration of moisture and/or oxygen. That is, the color filter layer 64 may perform the same functions as the passivation layer 40 of FIG. 3 that performs the functions of a color filter. The color filter layer 64 may be formed of the same material as the passivation layer 43 of FIG. 3. For example, the color filter layer 64 may be formed as a multilayer film in which a plurality of materials having different refractive indexes, such as, for example, silicon nitride and silicon oxide, are alternately stacked. The color filter layer 64 may seal the wavelength conversion layer 30 together with the passivation layer 43. Accordingly, the wavelength conversion layer 30 can be protected against moisture and/or oxygen by the color filter layer 64 and the passivation layer 43. That is, the color filter layer 64 can effectively prevent the infiltration of moisture and/or oxygen. Accordingly, the freedom of selection of the material of the base member 80 may increase.

Figure 20:
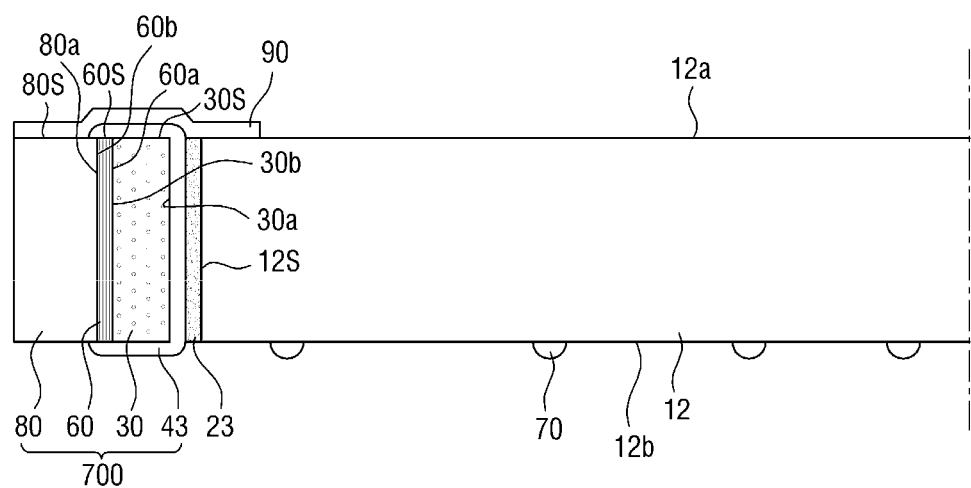
FIG. 20 is a cross-sectional view of an optical member according to another exemplary embodiment.

FIG. 20 is a cross-sectional view of an optical member according to another exemplary embodiment.

An optical member 115 of FIG. 20 differs from the optical member 113 of FIG. 18A in that it further includes a light transmission blocking pattern 90.

Referring to FIG. 20, the light transmission blocking pattern 90 absorbs or reflects incident light and partially or entirely blocks the transmission of light therethrough. The light transmittance of the light transmission blocking pattern 90 is lower than the light transmittance of a first low refractive layer 23, which is adjacent to the light transmission blocking pattern 90.

In one exemplary embodiment, the light transmission blocking pattern 90 may include a reflective layer. The reflective layer may comprise a light reflecting material having a high reflectance such as a metal. Alternatively, the reflective layer may have a structure in which a plurality of layers having different refractive indexes are stacked, such as that of a reflective polarizing film. The reflective layer may be deposited or coated directly on a wavelength conversion portion 700. Alternatively, an additional member including the reflective layer may be attached to the wavelength conversion portion 700 via an adhesive layer.

In another exemplary embodiment, the light transmission blocking pattern 90 may include a light absorbing layer. The light absorbing layer may comprise a light absorbing material such as a black pigment or dye. The light absorbing layer may be coated directly on the wavelength conversion portion 700 or may be attached on the wavelength conversion portion 700 via an adhesive layer.

The light transmission blocking pattern 90 may be disposed on at least one side surface of the wavelength conversion portion 700. The side surface of the wavelength conversion portion 700 may include side surfaces of elements of the wavelength conversion portion 700, i.e., side surfaces of a base member 80, a color filter layer 60, a wavelength conversion layer 30, and a passivation layer 43.

In the exemplary embodiment of FIG. 3, the passivation layer 43 performs the functions of a color filter and can improve optical efficiency and prevent light leakage by reflecting light diffused and/or scattered by the wavelength conversion layer 30. On the other hand, in the exemplary embodiment of FIG. 18A or 19, since the passivation layer 43 does not perform the functions of a color filter, light diffused and/or scattered by the wavelength conversion layer 30 may travel in a direction other than a direction toward the light guide plate 12 and may thus be perceived at a display screen as light leakage.

The light transmission blocking pattern 90 may be disposed on at least one side surface of the wavelength conversion portion 700 and may thus block light leakage or improve light incidence efficiency for the light guide plate 12.

In one exemplary embodiment, the light transmission blocking pattern 90 may be disposed on all side surfaces of the wavelength conversion portion 700. In another exemplary embodiment, the light transmission blocking pattern 90 may be disposed on a side surface of the wavelength conversion portion 700 that is connected to a top surface 12a of the light guide plate 12.

The light transmission blocking pattern 90 may cover an entire side surface 30s of the wavelength conversion layer 30 and may extend both outwardly and inwardly. The light transmission blocking pattern 90 may extend even to a side surface 80s of the base member 80 and may overlap with the base member 80. FIG. 20 illustrates the light transmission blocking pattern 90 as overlapping with the entire side surface 80s of the base member 80, but exemplary embodiments are not limited thereto. That is, alternatively, the light transmission blocking pattern 90 may overlap with only part of the side surface 80s of the base member 80 or may not overlap with the base member 80. The light transmission blocking pattern 90 may extend inwardly to cover an edge 23s of the first low refractive layer 23 and may further extend to partially overlap with the top surface 12a of the light guide plate 12, but exemplary embodiments are not limited thereto. That is, alternatively, the light transmission blocking pattern 90 may not overlap with the light guide plate 12.

Figure 21:
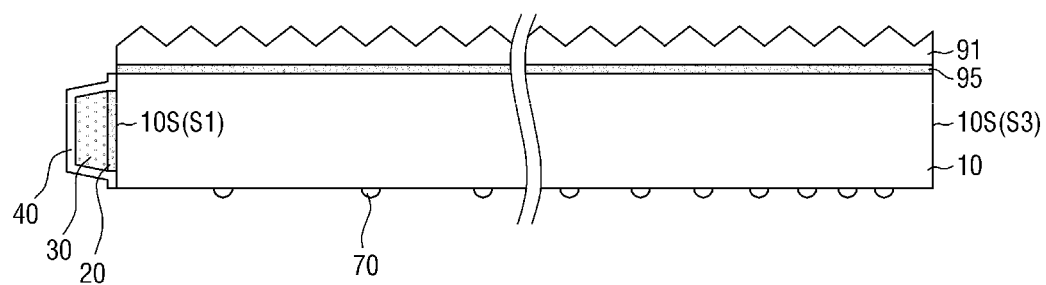
FIG. 21 and FIG. 22 are cross-sectional views of optical members according to other exemplary embodiments.
Figure 22:
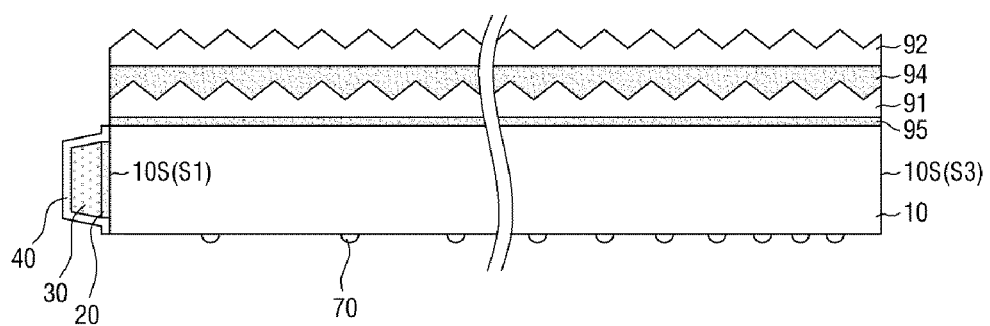

FIGS. 21 and 22 are cross-sectional views of optical members according to other exemplary embodiments.

FIGS. 21 and 22 illustrate optical members 116 and 117, respectively, which further include an integral optical function layer. The optical function layer is a layer changing or controlling the traveling direction, phase, and polarization state of light. For example, the optical function layer may perform at least one of the refraction, condensation, diffusion, scattering, reflective polarization, and phase retardation of light. The optical function layer may be a layer performing the same optical functions as a prism film, a diffusion film, a micro-lens film, a lenticular film, a polarizing film, a reflective polarizing film, and a retardation film that may be provided as separate films. The optical function layer may include structured optical patterns. The structured optical patterns have an uneven surface. The cross-sectional shape of the uneven surface may be, for example, polygonal such as triangular or trapezoidal, partially circular or elliptical, or amorphously random. The uneven surface may consist of line patterns extending in one direction or independent dot patterns, but exemplary embodiments are not limited thereto. The optical patterns, like a polarizing film or a reflective polarizing film, may have a flat surface.

The optical member 116 or 117 may include a first optical function layer 91, which is disposed on a top surface 10a of a light guide plate 10. The first optical function layer 91 is illustrated as being a prism pattern layer, but various other optical function layers such as a micro-lens layer may be used as the first optical function layer 91. The first optical function layer 91 may be formed of a material having the same refractive index as, or a similar refractive index to the light guide plate 10 or having a higher refractive index than the light guide plate 10. The refractive index of the first optical function layer 91 may be 1.5 to 1.8, but exemplary embodiments are not limited thereto.

The first optical function layer 91 may be disposed to overlap with the light guide plate 10. Side surfaces of the first optical function layer 91 may be aligned with side surfaces 10s of the light guide plate 10 or may be positioned inside the side surfaces 10s of the light guide plate 10.

A bonding layer 95 may be interposed between the first optical function layer 91 and the light guide plate 10. The bonding layer 95 may be formed of an adhesive material. Alternatively, the bonding layer 95 may be formed as a double-sided tape. The refractive index of the bonding layer 95 may be lower than the refractive index of the light guide plate 10. For example, the refractive index of the bonding layer 95 may be the same as the refractive index of the first low refractive layer 20. In a case where the bonding layer 95 has a low refractive index, an optical interface is formed between the light guide plate 10 and the bonding layer 95, and as a result, an optical guide function of the light guide plate 10 can be maintained.

FIG. 22 illustrates an optical member 117 including a plurality of optical function layers.

The optical member 117 of FIG. 22 differs from the optical member 116 of FIG. 21 in that it further includes a second optical function layer 92, which is disposed on a first optical function layer 91. Referring to FIG. 22, a second low refractive layer 94 is interposed between the second optical function layer 92 and the first optical function layer 91. The second low refractive layer 94 may be formed of one of the above-mentioned materials that can be used to form the first low refractive layer 20 of any one of the previous exemplary embodiments. The refractive index of the second low refractive layer 94 may be lower than the refractive index of the first optical function layer 91. For example, the difference between the refractive index of the first optical function layer 91 and the refractive index of the second low refractive layer 94 may be 0.2 or greater.

In a case where the first optical function layer 91 has unevenness on the surface thereof, the second low refractive layer 94 may fill all the unevenness on the surface of the first optical function layer 91. The second low refractive layer 94 may fill all recesses of the first optical function layer 91 and may cover even protrusions of the first optical function layer 91. In one exemplary embodiment, the second low refractive layer 94 may completely fill the space between the first and second optical function layers 91 and 92. The top surface of the second low refractive layer 94 may be flat, but exemplary embodiments are not limited thereto.

The second optical function layer 92 is disposed on the top surface of the second low refractive layer 94. The second optical function layer 92 may be formed of a material having the same refractive index as, or a similar refractive index to the second low refractive layer 94 or having a higher refractive index than the second low refractive layer 94. For example, the second optical function layer 92 may have the same refractive index as the first optical function layer 91.

The second low refractive layer 94 contributes to bonding and optical functions of the first and second optical function layers 91 and 92.

Specifically, since the second low refractive layer 94 completely fills the space between the first and second optical function layers 91 and 92, the first and second optical function layers 91 and 92 can be mechanically and stably coupled to each other.

Also, by using a material having a lower refractive index than the first optical function layer 91 to form the second low refractive layer 94, an optical function of the first optical function layer 91 can be maintained. In general, the surfaces of the first and second optical function layers 91 and 92 have structured patterns in order to change the path of light through refraction or reflection. This type of optical modulation function presupposes that each of the first and second optical function layers 91 and 92 has a different refractive index from the medium adjacent to the surface thereof. For example, if the second low refractive layer 94 has a similar refractive index to the first optical function layer 91, the traveling direction of light hardly changes at the interface between the second low refractive layer 94 and the first optical function layer 91 regardless of the shape of the surface of the first optical function layer 91. In the exemplary embodiment of FIG. 22, an optical interface may be formed by setting the refractive index of the second low refractive layer 94 to be lower than the refractive index of the first optical function layer 91, and as a result, the change of an optical path such as refraction can be performed. The optical interface may also be formed in a similar manner between the second low refractive layer 94 and the second optical function layer 92.

The second optical function layer 92 is illustrated as being a prism pattern layer, but various other optical function layers such as a micro-lens layer may be used as the second optical function layer 92. Also, the prism patterns of the first optical function layer 91 are illustrated as extending in parallel to the prism patterns of the second optical function layer 92, but the prism patterns of the first optical function layer 91 may intersect the prism patterns of the second optical function layer 92 at a right angle or another angle.

Figure 23:
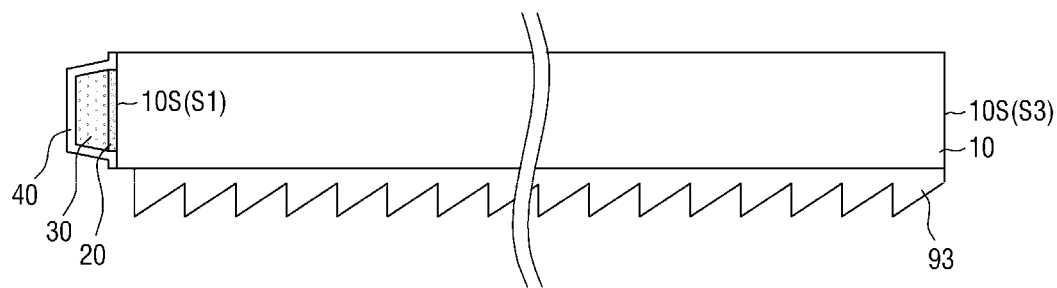
FIG. 23 is a cross-sectional view of an optical member according to another exemplary embodiment.

FIG. 23 is a cross-sectional view of an optical member according to another exemplary embodiment. FIG. 23 illustrates an optical member 118 in which an optical function layer is provided on a bottom surface 10b of a light guide plate 10.

Referring to FIG. 23, the optical member 118 includes a third optical function layer 93, which is disposed on the bottom surface 10b of the light guide plate 10, instead of diffusion patterns. Various optical function layers that can be used as the first optical function layer 91 of any one of the previous exemplary embodiments are applicable to the third optical function layer 93. For example, a reverse prism pattern layer may be used as the third optical function layer 93 to perform light condensation.

The third optical function layer 93 is disposed to overlap with the bottom surface 10b of the light guide plate 10. Side surfaces of the third optical function layer 93 may be aligned with side surfaces of the light guide plate 10 or may be positioned inside the side surfaces of the light guide plate 10. For example, a side surface of the third optical function layer 93 may be positioned inside a light incidence surface 10s1 of the light guide plate 10. By not providing the third optical function layer 93 on the light incidence surface 10s1 with a relatively large amount of light, the uniformity of luminance can be improved.

In a case where the third optical function layer 93 is provided, a first function optical function layer may not be provided on a top surface 10a of the light guide plate 10, but exemplary embodiments are not limited thereto. That is, alternatively, different types of optical function layers may be provided as a first optical function layer and the third optical function layer 93 to overlap with each other. For example, a prism pattern layer may be provided as a first optical function layer, and a lenticular pattern layer may be provided as the third optical function layer 93.

The optical members 100 through 118 according to the above-described exemplary embodiments are applicable to a display device or an illumination device. Display devices including an optical member, according to exemplary embodiments, will hereinafter be described.

Figure 24:
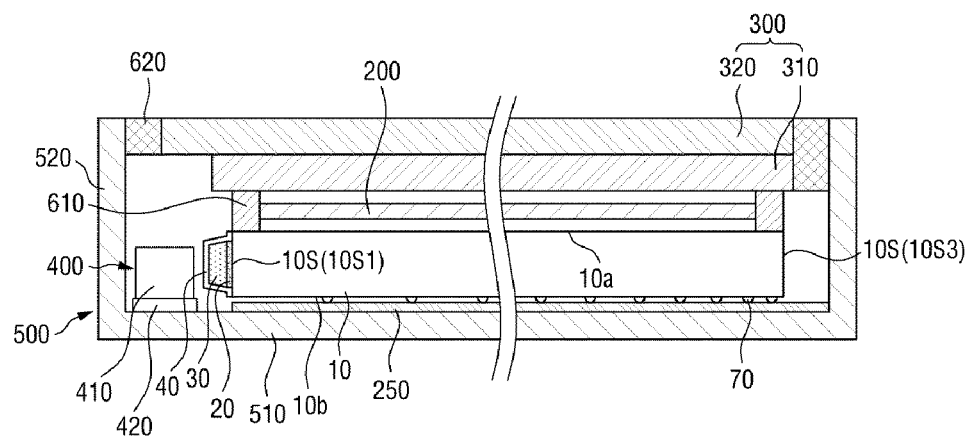
FIG. 24 and FIG. 25 are cross-sectional views of display devices according to exemplary embodiments.
Figure 25:
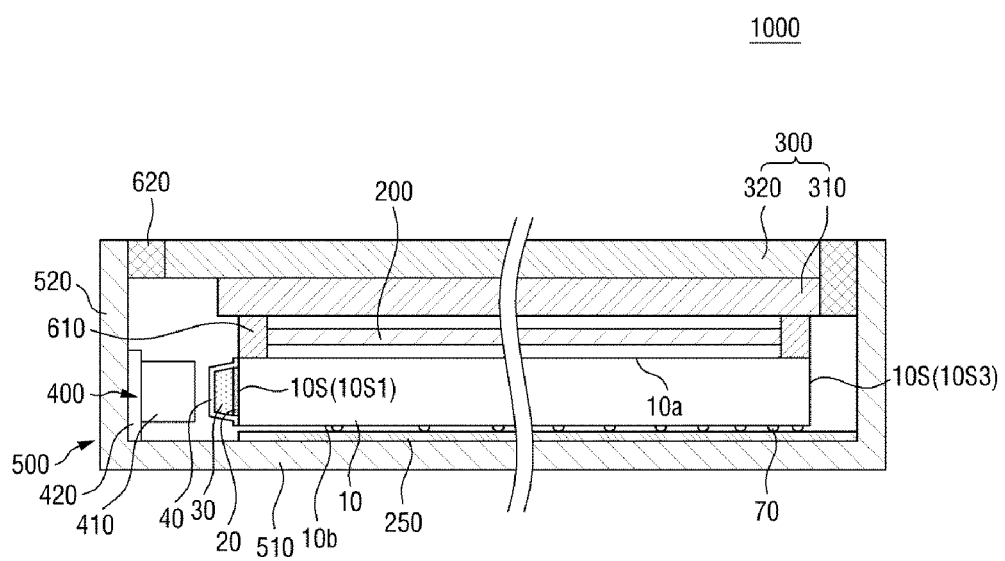

FIGS. 24 and 25 are cross-sectional views of display devices according to exemplary embodiments.

Referring to FIGS. 24 and 25, a display device 1000 or 1001 includes a light source 400 or 401, an optical member 100, which is disposed on the path of light emitted from the light source 400 or 401, and a display panel 300, which is disposed above the optical member 100.

The optical members 100 through 118 according to the above-described exemplary embodiments are all applicable to the display device 1000 or 1001. In the exemplary embodiments of FIGS. 24 and 25, the optical member 100 of FIG. 2 is used.

The light source 400 or 401 is disposed on one side of the optical member 100. The light source 400 or 401 may be disposed adjacent to a light incidence surface 10s1 of a light guide plate 10 of the optical member 100. The light source 400 or 401 may include a plurality of dot or line light sources. The dot light sources may be LEDs 410 or 411. The LEDs 410 or 411 may be mounted on a printed circuit board (PCB) 430 or 431. The LEDs 410 or 411 may emit blue-wavelength light.

In one exemplary embodiment, referring to FIG. 24, the LEDs 410 may be side-emitting LEDs, which emit light through the sides thereof. In this exemplary embodiment, the PCB 430 may be disposed on a bottom surface 510 of a housing 500.

In another exemplary embodiment, referring to FIG. 25, the LEDs 411 may be top-emitting LEDs, which emit light through the top surface thereof. In this exemplary embodiment, the PCB 431 may be disposed on a side wall 520 of the housing 500.

The blue-wavelength light emitted from the LEDs 410 or 411 is incident upon a wavelength conversion layer 30 of the optical member 100. The wavelength conversion layer 30 converts the blue-wavelength light incident thereupon into, for example, green-wavelength and red-wavelength light. The green-wavelength and red-wavelength light is incident upon the light guide plate 10 together with the blue-wavelength light that remains unconverted by the wavelength conversion layer 30. The light guide plate 10 of the optical member 100 guides light and emits it through a top surface 10a or a bottom surface 10b thereof.

The display device 1000 or 1001 may further include a reflective member 250, which is disposed below the optical member 100. The reflective member 250 may include a reflective film or a reflective coating layer. The reflective member 250 reflects light emitted from the bottom surface 10b of the light guide plate 10 of the optical member 100 so that the light can enter the light guide plate 10 again.

The display panel 300 is disposed above the optical member 100. The display panel 300 may be a light-receiving display panel receiving light from the optical member 100 and displaying a screen. Examples of the light-receiving display panel include a liquid crystal display (LCD) panel and an electrophoretic panel. The display panel 300 will hereinafter be described as being an LCD panel, but various other light-receiving display panels are also applicable to the display device 1000 or 1001.

The display panel 300 may include a first substrate 310, a second substrate 320, which faces the first substrate 310, and a liquid crystal layer (not illustrated), which is disposed between the first and second substrates 310 and 320. The first and second substrates 310 and 320 overlap with each other. In one exemplary embodiment, one of the first and second substrates 310 and 320 may be larger than the other substrate and may thus protrude outwardly beyond the other substrate. The second substrate 320, which is disposed on the first substrate 310, is illustrated as being larger than the first substrate 310 and protruding beyond the first substrate 310 on a side where the light source 400 or 410 is disposed. Part of the second substrate 320 that protrudes beyond the first substrate 310 may provide a space in which to mount a driving chip or an external circuit board. Alternatively, the first substrate 310, which is disposed below the second substrate 320, may be larger than the second substrate 320 and may protrude outwardly beyond the second substrate 320. The overlapping area of the first and second substrates 310 and 320 may be substantially aligned with both side surfaces 10s of the light guide plate 10 of the optical member 100.

The optical member 100 may be coupled to the display panel 300 via an inter-module coupling member 610. The inter-module coupling member 610 may be formed as a rectangular frame in a plan view. The inter-module coupling member 610 may be positioned along the edges of the display panel 300 and the edges of the optical member 100.

In one exemplary embodiment, the bottom surface of the inter-module coupling member 610 may be positioned on the top surface 10a of the light guide plate 10 of the optical member 100. The bottom surface of the inter-module coupling member 610 may overlap with the top surface 10a of the light guide plate 10, but not with the side surfaces 10s of the light guide plate 10.

The inter-module coupling member 610 may include a polymer resin or an adhesive tape.

In some exemplary embodiments, the inter-module coupling member 610 may additionally perform the functions of the light transmission blocking pattern 90 of FIG. 21. For example, the inter-module coupling member 610 may comprise a light absorbing material such as a black pigment or dye or a reflective material and may thus perform the function of blocking the transmission of light.

The display device 1000 or 1001 may further include the housing 500. The housing 500 is open at one side thereof and includes a bottom surface 510 and side walls 520 connected to the bottom surface 510. The light source 400 or 401, a structure formed by coupling the optical member 100 and the display panel 300, and the reflective member 250 may be accommodated in a space defined by the bottom surface 510 and the side walls 520. The light source 400 or 401, the reflective member 250, the reflective member 250, and the structure formed by coupling the optical member 100 and the display panel 300 are disposed on the bottom surface 510 of the housing 500. The height of the side walls 520 of the housing 500 may be substantially the same as the height of the structure formed by coupling the optical member 100 and the display panel 300 inside the housing 500. The display panel 300 is disposed adjacent to upper portions of the side walls 520 of the housing 500, and the display panel 300 and the housing 500 may be coupled to each other by a housing coupling member 620. The housing coupling member 620 may be formed as a rectangular frame. The housing coupling member 620 may include a polymer resin or an adhesive tape.

The display device 1000 or 1001 may further include at least one optical film 200. The optical film 200 may be received in a space surrounded by the inter-module coupling member 610 between the optical member 100 and the display panel 300. Side surfaces of the optical film 200 may be placed in contact with, and attached to, inner side surfaces of the inter-module coupling member 610. The optical film 200 and the optical member 100 are illustrated as being spaced apart from each other, and the optical film 200 and the display panel 300 are illustrated as being spaced apart from each other. However, such gaps are not necessarily formed between the optical film 200 and the optical member 100 and between the optical film 200 and the display panel 300.

The optical film 200 may be a prism film, a diffusion film, a micro-lens film, a lenticular film, a polarizing film, a reflective polarizing film, or a retardation film. The display device 1000 or 1001 may include a plurality of optical films 200, which are of the same type or of different types. In a case where the display device 1000 or 1001 includes a plurality of optical films 200, the plurality of optical films 200 may be disposed to overlap with one another, and side surfaces of each of the plurality of optical films 200 may be placed in contact with, and attached to, the inner side surfaces of the inter-module coupling member 610. The plurality of optical films 200 may be spaced apart from one another, and an air layer may be disposed between the plurality of optical films 200.

In one exemplary embodiment, a composite film into which two or more optical function layers are incorporated may be used as the optical film 200, and this will hereinafter be described with reference to FIG. 26.

Figure 26:
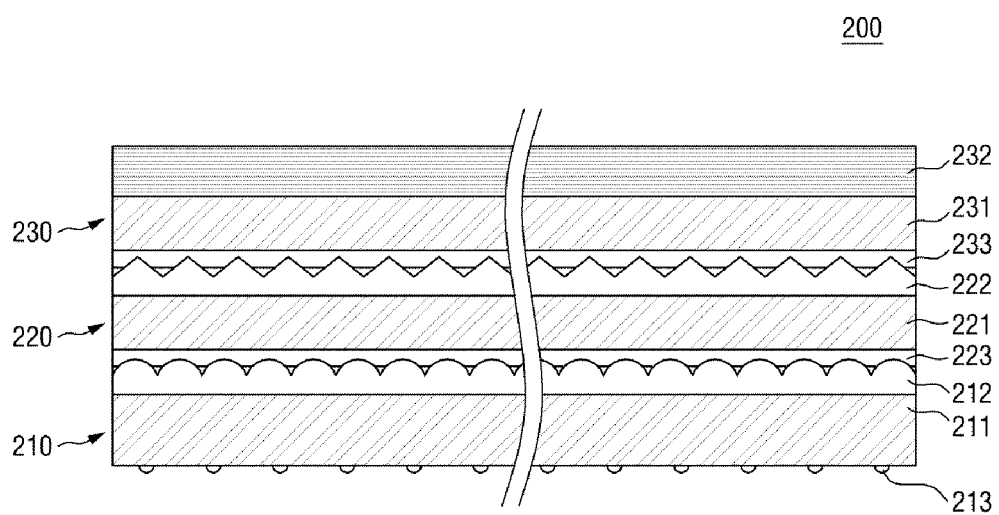
FIG. 26 is a cross-sectional view of an optical film according to an exemplary embodiment.

FIG. 26 is a cross-sectional view of an optical film according to an exemplary embodiment. Referring to FIG. 26, an optical film 200 may include first, second, and third films 210, 220, and 230.

The first film 210 may include a first base 211, a back coating layer 213, which is disposed on the bottom surface of the first base 211, and a first optical pattern layer 212, which is disposed on the top surface of the first base 211. If the optical film 200 is disposed to be spaced apart from an optical member (not illustrated), the back coating layer 213 may be omitted.

The second film 220 may include a second base 221, a first bonding resin layer 223, which is disposed on the bottom surface of the second base 221, and a second optical pattern layer 222, which is disposed on the top surface of the second base 221.

The third film 230 may include a third base 231, a second bonding resin layer 233, which is disposed on the bottom surface of the third base 231, and an optical layer 232, which is disposed on the top surface of the third base 231.

The first optical pattern layer 212 includes protrusions and recesses, and some of the protrusions of the first optical pattern layer 212 are placed in contact with the first bonding resin layer 223 or may penetrate into, and may be coupled to, the first bonding resin layer 223. An air layer is disposed between the recesses of the first optical pattern layer 212 and the first bonding resin layer 223.

The second optical pattern layer 222 includes protrusions and recesses, and some of the protrusions of the second optical pattern layer 222 are placed in contact with the second bonding resin layer 233 or may penetrate into, and may be coupled to, the second bonding resin layer 233. An air layer is disposed between the recesses of the second optical pattern layer 222 and the second bonding resin layer 233.

In one exemplary embodiment, the first optical pattern layer 212 may be a micro-lens pattern layer or a diffusion layer, the second optical pattern layer 222 may be a prism pattern layer, and the optical layer 232 of the third film 230 may be a reflective polarizing layer. In another exemplary embodiment, the first optical pattern layer 212 may be a prism pattern layer, the second optical pattern layer 222 may be a prism pattern layer (including prism patterns intersecting the prism patterns of the first optical pattern layer 212), and the optical layer 232 of the third film 230 may be a reflective polarizing layer. In these exemplary embodiments, the third base 231 of the third film 230 may be omitted, and the second bonding resin layer 233 may be disposed on the bottom surface of the optical layer 232. Various function layers other than those set forth herein may be used as the first optical pattern layer 212, the second optical pattern layer 222, and the optical layer 232. Two films or four or more films may be incorporated into a single film and may then be used as the first optical pattern layer 212, the second optical pattern layer 222, or the optical layer 232.

In a case where the optical member 116, 117, or 118 of FIG. 21, 22, or 23, which includes an integral optical function layer, is used, all or some of the films of the optical film 200 that perform redundant optical functions may be omitted.

In the display device 1000 or 1001 of FIG. 24 or 25, the optical member 100, the display panel 300, and even the optical film 200 are incorporated with one another by the inter-module coupling member 610, and the display panel 300 and the housing 500 are coupled by the housing coupling member 620. Accordingly, even if no mold frame is provided, the elements of the display device 1000 or 1001 can be stably coupled together, and the weight of the display device 1000 or 1001 can be reduced. Also, since the light guide plate 10 and the wavelength conversion layer 30 are incorporated with each other, the bezel space of the display device 1000 or 1001 can be reduced. Also, since the side surfaces of the display panel 300 and the side walls 520 of the housing 500 are coupled by the housing coupling member 620, the bezel space on the sides of a display screen can be eliminated or at least minimized.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical member, comprising:
    a light guide plate comprising a top surface, a bottom surface, and side surfaces which are disposed in between and connect the top surface and the bottom surface, wherein each of the side surfaces has a smaller area than each of the top surface and the bottom surface;
    a low refractive layer disposed on a side surface of the light guide plate and having a lower refractive index than the light guide plate;
    a wavelength conversion layer disposed on the low refractive layer, the wavelength conversion layer configured to receive a first wavelength light and convert the first wavelength light into a second wavelength light which is of a different wavelength band from the first wavelength light; and
    a passivation layer disposed on the wavelength conversion layer,
    wherein:
    the low refractive layer comprises a first surface, which faces the side surface of the light guide plate where the low refractive layer is disposed, a second surface, which is opposite to the first surface of the low refractive layer, and edges, and
    the wavelength conversion layer comprises a first surface, which faces the second surface of the low refractive layer, a second surface, which is opposite to the first surface of the wavelength conversion layer, and side surfaces, which are disposed in between and connect the first and second surfaces of the wavelength conversion layer, and
    wherein the passivation layer is configured to transmit the first wavelength light therethrough and reflect the second wavelength light.

2. The optical member of claim 1, wherein the passivation layer is disposed on the second surface of the wavelength conversion layer and covers the second surface and the side surfaces of the wavelength conversion layer and the edges of the low refractive layer.

3. The optical member of claim 2, wherein the first surface of the low refractive layer is in contact with the side surface of the light guide plate where the low refractive layer is disposed.

4. The optical member of claim 3, wherein the passivation layer is in contact with the light guide plate.

5. The optical member of claim 2, wherein the side surfaces of the wavelength conversion layer are positioned inside the edges of the low refractive layer.

6. The optical member of claim 2, wherein the edges of the low refractive layer and the side surfaces of the wavelength conversion layer are positioned inside the top surface and the bottom surface of the light guide plate.

7. A display device, comprising:
    an optical member which comprises:
    a light guide plate comprising a top surface, a bottom surface, and side surfaces that are disposed in between and connect the top surface and the bottom surface;
    a low refractive layer disposed on a side surface of the light guide plate and having a lower refractive index than the light guide plate;
    a wavelength conversion layer disposed on the low refractive layer, the wavelength conversion layer configured to receive a first wavelength light and convert the first wavelength light into a second wavelength light that is of a different wavelength band from the first wavelength light; and
    a passivation layer disposed on the wavelength conversion layer;
    a light source disposed adjacent to the side surface of the light guide plate where the low refractive layer is disposed; and
    a display panel disposed on the top surface of the light guide plate,
    wherein:

the low refractive layer comprises a first surface that faces the side surface of the light guide plate, a second surface opposite to the first surface of the low refractive layer, and edges, and the wavelength conversion layer comprises a first surface that faces the side surface of the light guide plate where the low refractive layer is disposed, a second surface opposite to the first surface of the wavelength conversion layer, and side surfaces that are disposed in between and connect the first and second surfaces of the wavelength conversion layer, and wherein the passivation layer transmits the first wavelength light therethrough and reflects the second wavelength light.

8. The display device of claim 7, wherein the passivation layer is disposed on the second surface of the wavelength conversion layer and covers the second surface and the side surfaces of the wavelength conversion layer and the edges of the low refractive layer.

9. The display device of claim 7, wherein the passivation layer is disposed between the wavelength conversion layer and the low refractive layer, and covers the first surface and the side surfaces of the wavelength conversion layer.

10. The display device of claim 9, wherein the edges of the low refractive layer are substantially aligned with the side surfaces of the wavelength conversion layer, and the side surfaces of the wavelength conversion layer perpendicularly intersect the second surface of the low refractive layer.

11. The display device of claim 9, further comprising:

a light transmission blocking pattern overlapping with a side surface of the wavelength conversion layer and disposed substantially in parallel to the top surface of the light guide plate.

\* \* \* \* \*